US010154755B2

(12) United States Patent
Park

(10) Patent No.: US 10,154,755 B2
(45) Date of Patent: Dec. 18, 2018

(54) METHOD FOR MANUFACTURING EXOTHERMIC CERAMICS FOR MICROWAVE OVEN AND EXOTHERMIC CERAMICS FOR MICROWAVES

(71) Applicant: In Ho Park, Seoul (KR)

(72) Inventor: In Ho Park, Seoul (KR)

( * ) Notice: Subject to any disclaimer, the term of this patent is extended or adjusted under 35 U.S.C. 154(b) by 578 days.

(21) Appl. No.: 14/781,795

(22) PCT Filed: Apr. 2, 2014

(86) PCT No.: PCT/KR2014/002835
§ 371 (c)(1),
(2) Date: Oct. 1, 2015

(87) PCT Pub. No.: WO2014/163395
PCT Pub. Date: Oct. 9, 2014

(65) Prior Publication Data
US 2016/0015207 A1    Jan. 21, 2016

(30) Foreign Application Priority Data

Apr. 5, 2013 (KR) .................. 10-2013-0037288
Nov. 4, 2013 (KR) .................. 10-2013-0132859
Jan. 24, 2014 (KR) .................. 10-2014-0008801

(51) Int. Cl.
*H05B 6/64* (2006.01)
*A47J 36/04* (2006.01)
(Continued)

(52) U.S. Cl.
CPC .......... *A47J 36/027* (2013.01); *A47J 27/002* (2013.01); *A47J 36/04* (2013.01); *B28B 1/24* (2013.01);
(Continued)

(58) Field of Classification Search
CPC .... A47J 27/002; C04B 33/13; C04B 35/6263; C04B 2235/3201; C04B 2235/3427;
(Continued)

(56) References Cited

U.S. PATENT DOCUMENTS

2012/0255699 A1* 10/2012 Sepelak .................. B22C 9/06
164/54

FOREIGN PATENT DOCUMENTS

JP      201200513788      6/2012
JP      201200152253      8/2012
(Continued)

*Primary Examiner* — Quang Van
(74) *Attorney, Agent, or Firm* — John K. Park; Park Law Firm

(57) ABSTRACT

Disclosed are a method for manufacturing exothermic ceramics for a microwave oven and exothermic ceramics for microwaves. In particular, provided is a method for manufacturing exothermic ceramics for a microwave oven, in which the exothermic ceramics are formed by mixing a ceramic body, such as clay, plastic clay or soil, with an exothermic element prepared by combining at least one selected from silicon carbide, carbon ferrite and iron oxide, which are exothermic components. Accordingly, the exothermic ceramics of the present invention can minimize a sense of difference between the exothermic element and the ceramic body component, which is raw material for ceramics, thereby being capable of emitting high-temperature heat in a short time by means of microwaves as well as maintaining stability in the shape. Furthermore, due to integral forming, the exothermic ceramics have an enhanced elegant design.

21 Claims, 16 Drawing Sheets

(51) Int. Cl.
*A47J 36/02* (2006.01)
*C04B 33/13* (2006.01)
*C04B 33/24* (2006.01)
*C04B 33/34* (2006.01)
*A47J 27/00* (2006.01)
*B28B 1/24* (2006.01)
*B28B 1/26* (2006.01)
*B32B 1/02* (2006.01)
*B32B 18/00* (2006.01)
*B32B 9/00* (2006.01)
*C04B 35/26* (2006.01)
*C04B 35/565* (2006.01)
*C04B 35/626* (2006.01)

(52) U.S. Cl.
CPC .............. *B28B 1/26* (2013.01); *B32B 1/02* (2013.01); *B32B 9/005* (2013.01); *B32B 18/00* (2013.01); *C04B 33/13* (2013.01); *C04B 33/131* (2013.01); *C04B 33/24* (2013.01); *C04B 33/34* (2013.01); *C04B 35/26* (2013.01); *C04B 35/565* (2013.01); *C04B 35/6263* (2013.01); *H05B 6/6408* (2013.01); *B32B 2307/306* (2013.01); *B32B 2439/02* (2013.01); *C04B 2235/3201* (2013.01); *C04B 2235/3272* (2013.01); *C04B 2235/3274* (2013.01); *C04B 2235/349* (2013.01); *C04B 2235/3427* (2013.01); *C04B 2235/3826* (2013.01); *C04B 2235/422* (2013.01); *C04B 2235/602* (2013.01); *C04B 2235/6022* (2013.01); *C04B 2235/6027* (2013.01); *C04B 2235/94* (2013.01); *C04B 2237/34* (2013.01); *C04B 2237/341* (2013.01); *C04B 2237/365* (2013.01); *C04B 2237/84* (2013.01)

(58) Field of Classification Search
CPC ........ C04B 2235/349; C04B 2235/602; C04B 2235/6022; C04B 2235/94; C04B 2237/34; C04B 2237/341; C04B 2237/365; C04B 2237/84
USPC .......... 219/730, 725, 728, 729, 552; 164/54, 164/271; 264/86, 255, 628; 206/54.22
See application file for complete search history.

(56) References Cited

FOREIGN PATENT DOCUMENTS

| | | |
|---|---|---|
| JP | 201300255626 | 12/2013 |
| JP | 000005483026 B2 | 2/2014 |
| KR | 1020040098919 | 12/2004 |
| KR | 10-1174766 B1 | 8/2012 |
| KR | 1020120037783 | 8/2012 |
| KR | 10-2012-0114506 A | 10/2012 |

* cited by examiner (1) Heat-resisting slip raw material input (2) Work for pouring out heat-resisting slip raw material (3) Work for inputting exothermic slip raw material

METHOD FOR MANUFACTURING EXOTHERMIC CERAMICS FOR MICROWAVE OVEN AND EXOTHERMIC CERAMICS FOR MICROWAVES

TECHNICAL FIELD

The present invention relates to a method for manufacturing an exothermic ceramic which is able to generate heat while acting with microwaves from a microwave oven, and in particular to a method for manufacturing an exothermic ceramic and an exothermic ceramic having an enhanced elegant device, which are able to minimize a sense of difference between an exothermic element and a ceramic raw material component, which is a raw material for ceramics, in such a way to combine a ceramic raw material, for example, clay, plastic clay, soil, etc. with an exothermic element made by combining at least one selected from silicon carbide, carbon, ferrite, iron oxide, etc. which are exothermic components, and to form them, thus maintaining a stability in shape and heating to a high temperature in a short time with the aid of microwaves.

BACKGROUND ART

A microwave oven, in general, is a device for cooking by using a friction heat generating due to molecule collision within a cooking target in such a way to emit microwaves, which is a high frequency, to the cooking target. More specifically, the microwave oven is designed to heat foods in such a way to generate heat with the aid of a molecule movement by forcibly vibrating water molecules within a food which will be cooked using energy from a high frequency oscillator called a magnetron. Such a microwave oven is widely used thanks to its advantage in the way that a food can be cooked in easier and faster ways. In recent years, various cooking devices are being developed, which are able to enhance efficiency in terms of a food heating in such a way to emit heat thanks to the heating to a high temperature using microwaves.

In relation with a conventional cooking device for a microwave oven, it is disclosed in the Korean patent publication number 10-2004-0108367. According to claim 1 in the above patent, there is disclosed an exothermic container for an electromagnetic induction heating device wherein in a heating container used for an electromagnetic induction heating device, the exothermic container is constituted by laminating three circular metallic plates, and a first metal plate configured to accommodate a food which will be cooked, is made of a steel plate, and a second metal plate installed under the first metal plate is made of an aluminum plate, and a third metal plate installed under the second metal plate is made of a steel plate. The configuration of the above exothermic container is complicated, and the weight is heavy, and a manufacturing cost is high.

Except for the above patent, as another conventional art, there is the Korean patent registration number 10-1174766 which discloses another conventional technology. According to claim 1, there is disclosed a method for manufacturing a cooking container for a microwave oven which includes a forming step wherein 20~30 part by weight of water is mixed with respect to the total 100 part by weight of a mixture formed of ferrite and clay, and the formed mixture is processed in a vacuum-pug way, thus forming a container and a finishing member; an adhering step wherein an exothermic body is inserted between the container and the finishing member, and an adhesive liquid prepared by mixing 40~60 part by weight of water with respect to the total 100 part by weight of the mixture formed of ferrite and clay is coated and adhered; a piercing step wherein a mold formed through the adhering step is dried, thus forming, in the finishing member, air holes which communicate with the exothermic body; a biscuit firing step wherein the mold with the formed air holes is inputted into a calcination furnace and is burnt at 800~1000° C.; and a glaze firing step wherein glaze is coated over the mold which was biscuit-fired, and the mold is burnt at 1200~1400° C. in the calcination furnace. However, since the heating is limitedly performed by the exothermic body, efficiency is low, and a manufacturing process is complicated, whereupon a mass production is difficult, and an economical manufacturing is hard to achieve. In particular, a conventional cooking device and cooking container which uses microwaves are bulky in volume and have complicated configurations. To this end, a freedom in terms of a shape design of a product is limited, and a manufacturing cost is high. For this reason, an economical supply is difficult.

Therefore, it is urgent to develop an exothermic container and ceramic using a microwave which can be easily manufactured by a standardized manufacturing process and can be mass-produced, thus obtaining an economical manufacturing and supply, while providing an enhanced freedom in design of a product.

DISCLOSURE OF INVENTION

Accordingly, the present invention is made in an effort to resolve the above-mentioned problems. It is an object of the present invention to provide a method for manufacturing an exothermic ceramic for a microwave oven which is able to secure a stability in shape in a formed state in such a way to minimize a sensor of difference between an exothermic element and a ceramic raw material by appropriately mixing and forming an exothermic element, for example, a silicon carbine, etc. having an exothermic characteristic and a ceramic raw material, for example, clay, plastic clay, and soil. In particular, the present invention allows to obtain a mass production, an economical manufacturing and a supply through a standardized manufacturing process, and microwaves allow to heat to a high temperature in a short time.

It is another object of the present invention to provide an exothermic body which allows to secure a stability in shape after forming while enhancing formability in such a way to minimize a sensor of difference that an exothermic element has, by appropriately mixing an exothermic element (one of silicon carbide, carbon, ferrite, iron oxide, etc. or a combination of at least two of them) with a raw material (one of blue ceramic clay, white ceramic clay, combined clay, Sanchung clay, pottery clay, ceramic clay, heat-resisting clay, clay, white clay, soil, etc. or a combination of at least two of them).

It is further another object of the present invention to provide an exothermic ceramic which uses an exothermic body having an enhanced elegance in design in such a way to integrate an exothermic body which is previously formed during a ceramic forming procedure with a ceramic forming article having a bowl or plate shape.

To achieve the above objects, according to a first embodiment of the present invention, there is provided a method for manufacturing exothermic ceramics for a microwave oven wherein heat can be emitted in response to microwaves, and an article is made using a raw material which is used to manufacture ceramics, and an exothermic plate body is made of an exothermic element prepared by mixing with one or more selected from the group consisting of silicon carbide, ferrite and iron oxide, which includes preparing a ceramic raw material in such a way to mix and agitate 3~35 part of water with respect to the total 100 part of a raw material used to manufacture ceramics; preparing an exothermic raw material in such a way to mix 1~32 part by weight of water with respect to the total 100 part by weight of a mixture which is prepared by mixing the ceramic raw material and the exothermic element at a weight ratio of 3~7:7~3; forming a main body wherein an exterior of an article is formed, wherein the article is formed using the above prepared ceramic raw material by any forming method among a press forming method, an automatic and manual roller machine forming method, a pressure injection method, and a slip casting formation method; and forming an exothermic plate body wherein a plate body is formed by any of a press formation method, an automatic and manual roller machine formation method, a pressure injection formation method and a slip casting formation method so that the exothermic plate body can be formed using the prepared exothermic raw material on an upper surface or lower surface of the bottom of the body or can be buried inside the bottom thereof.

To achieve the above objects, according to a second embodiment of the present invention, there is provided a method for manufacturing exothermic ceramics for a microwave oven wherein heat can be emitted in response to microwaves, and an article is made using a raw material which is used to manufacture ceramics, and an exothermic plate body is made of an exothermic element prepared by mixing with one or more selected from the group consisting of silicon carbide, ferrite and iron oxide, which includes preparing a ceramic raw material in such a way to mix and agitate 3~35 part of water with respect to the total 100 part of a raw material used to manufacture ceramics; preparing an exothermic raw material in such a way to mix 1~32 part by weight of water with respect to the total 100 part by weight of a mixture which is prepared by mixing the ceramic raw material and the exothermic element at a weight ratio of 3~7:7~3; forming an exothermic plate body wherein a plate body is formed and has a thickness of 5~95% with respect to a bottom thickness of a forming article which will be finished, using the prepared exothermic raw material, the exothermic plate body being formed in such a way to inject the exothermic raw material into a pressure injection gypsum frame for the formation of the exothermic body; and finishing an article formation wherein the article is formed in such a way to inject a ceramic raw material after the formed exothermic plate body is positioned in the pressure injection gypsum frame for the formation of the article so that the formed exothermic plate body can be positioned on the upper surface or lower surface of the bottom of the forming article.

To achieve the above objects, according to a third embodiment of the present invention, there is provided a method for manufacturing exothermic ceramics for a microwave oven wherein heat can be emitted in response to microwaves, and an article is made using a raw material which is used to manufacture ceramics, and an exothermic plate body is made of an exothermic element prepared by mixing with one or more selected from the group consisting of silicon carbide, ferrite and iron oxide, which includes forming a first article in such a way that 3~35 part by weight of water mixed and agitated with respect to the total 100 part by weight of a raw material used to manufacture ceramics is injected into a first article gypsum frame of a pressure injection type and is formed; preparing a burial body wherein an exothermic raw material prepared in such a way to mix 1~32 part by weight of water with respect to the total 100 part by weight of a mixture prepared by mixing at a weight ratio of 3~7:7~3 a ceramic raw material and an exothermic element is formed into a shape of a circular plate, a polygonal plate or a mesh; and forming a second article wherein an article is finished in such a way that an exothermic burial body formed on the upper surface or lower surface of the bottom of the formed first article is positioned, and then is positioned in the second article gypsum frame of the pressure injection type, and the exothermic burial body is buried by injecting the ceramic raw material.

To achieve the above objects, according to a first embodiment of the present invention, there is provided a method for manufacturing exothermic ceramics for a microwave oven wherein heat can be emitted in response to microwaves, and an article is made using a raw material which is used to manufacture ceramics, and an exothermic plate body is made of an exothermic element prepared by mixing with one or more selected from the group consisting of silicon carbide, ferrite and iron oxide, which includes preparing a ceramic raw material in such a way that 3~32 part by weight is mixed with respect to the total 100 part by weight of a raw material used to manufacture a ceramic; preparing an exothermic raw material in such a way that 1~32 part by weight is mixed with respect to the total 100 part by weight of a mixture prepared by mixing at a weight ratio of 3~7:7~3 a ceramic raw material and an exothermic element; forming a first article in such a way that the shape of the article is formed by placing the prepared ceramic raw material in a first press mold of a press forming type; and forming a second article wherein an exothermic plate body is formed in such a way that an exothermic raw material is positioned on the upper surface or lower surface of the bottom of the formed first article and is placed in a second press mold of a press forming type and is press-formed.

To achieve the above objects, according to a fifth embodiment of the present invention, there is provided a method for manufacturing exothermic ceramics for a microwave oven wherein heat can be emitted in response to microwaves, and an article is made using a raw material which is used to manufacture ceramics, and an exothermic plate body is made of an exothermic element prepared by mixing with one or more selected from the group consisting of silicon carbide, ferrite and iron oxide, which includes preparing a ceramic raw material in such a way that 3~32 part by weight is mixed with respect to the total 100 part by weight of a raw material used to manufacture a ceramic; preparing an exothermic raw material in such a way that 1~32 part by weight is mixed with respect to the total 100 part by weight of a mixture prepared by mixing at a weight ratio of 3~7:7~3 a ceramic raw material and an exothermic element; forming an external article wherein an exterior of an article is formed in such a way that the prepared ceramic raw material is filled in a first press mold and is press-formed; forming an exothermic plate body wherein an exothermic raw material is filled in the inside of the formed exterior article and is press-formed, and the exothermic plate body is placed; and forming an internal article wherein an interior of an article is formed in such a way that a ceramic raw material is filled in the inside of the exterior article and is press-formed, thus burying the exothermic plate body.

To achieve the above objects, according to a sixth embodiment of the present invention, there is provided a method for manufacturing exothermic ceramics for a microwave oven wherein heat can be emitted in response to microwaves, and an article is made using a raw material which is used to manufacture ceramics, and an exothermic plate body is made of an exothermic element prepared by mixing with one or more selected from the group consisting of silicon carbide, ferrite and iron oxide, which includes preparing a ceramic raw material in such a way that 3~35 part by weight is mixed with respect to the total 100 part by weight of a raw material used to manufacture ceramics, and the mixture is processed in a vacuum-pug way; preparing an exothermic raw material in such a way that 1~32 part by weight of water is mixed with respect to the total 100 part by eight of a mixture which is prepared by mixing at a mixing ratio of 3~7:7~3 a ceramic raw material and an exothermic element, and the mixture is processed in a vacuum-pug way; forming a first article in such a way that the prepared ceramic raw material is inputted into an automatic and manual roller machine gypsum frame of a spinning wheel forming type and is formed, thus forming a first article; and forming a second article in such a way that the vacuum-pug processed exothermic raw material is inputted into the inside of the first article, and an exothermic plate body of a plate body shape is formed using an automatic and manual roller machine.

To achieve the above objects, according to a seventh embodiment of the present invention, there is provided a method for manufacturing exothermic ceramics for a microwave oven wherein heat can be emitted in response to microwaves, and an article is made using a raw material which is used to manufacture ceramics, and an exothermic plate body is made of an exothermic element prepared by mixing with one or more selected from the group consisting of silicon carbide, ferrite and iron oxide, which includes preparing a ceramic raw material in such a way that 3~35 part by weight is mixed with respect to the total 100 part by weight of a raw material used to manufacture ceramics, and the mixture is processed in a vacuum-pug way; preparing an exothermic raw material in such a way that 1~32 part by weight of water is mixed with respect to the total 100 part by eight of a mixture which is prepared by mixing at a mixing ratio of 3~7:7~3 a ceramic raw material and an exothermic element, and the mixture is processed in a vacuum-pug way; forming an exothermic plate in such a way that the prepared exothermic raw material is inputted into a roller machine gypsum frame, and a bottom portion of the article is formed; and forming a article wherein a ceramic raw material is inputted onto the upper surface of the formed exothermic plate, and then an exterior of the article is finished through the roller machine formation.

To achieve the above objects, according to an eighth embodiment of the present invention, there is provided a method for manufacturing exothermic ceramics for a microwave oven wherein heat can be emitted in response to microwaves, and an article is made using a raw material which is used to manufacture ceramics, and an exothermic plate body is made of an exothermic element prepared by mixing with one or more selected from the group consisting of silicon carbide, ferrite and iron oxide, which includes preparing an article slip in a soil-mixed water state in such a way that a raw material used to manufacture ceramics and water are mixed and agitated; performing a first slip casting in such a way that an article slip is injected into an article formation gypsum mold to form an article, and after 5~ minutes pass, an article slip in a soil-mixed water state is removed; preparing an exothermic raw material in such a way that an exothermic raw material is prepared by mixing at a weight ratio of 3~7:7~3 a raw material used to manufacture ceramics and an exothermic element; forming an exothermic body in such a way that an exothermic slip in a soil-mixed water state by mixing an exothermic raw material with water is injected into a gypsum mold in which an article is formed, and after 5~60 minutes pass, the exothermic body slip is poured out, thus forming a casting exothermic body or a casting exothermic body in a place shape is formed using the prepared exothermic raw material, and it is positioned at a predetermined position at the article inside the gypsum mold; performing a second slip casting in such a way that the article slip is injected into the gypsum mold where the exothermic body positions, and after 5~60 minutes pass, the article slip in the soil-mixed water state is removed to the outside, thus forming an interior article; and removing an article from a mold wherein after the second slip casting is performed, and 5~60 minutes pass, a finished article is removed from the gypsum mold.

To achieve the above objects, according to an eighth embodiment of the present invention, there is provided a method for manufacturing exothermic ceramics for a microwave oven wherein heat can be emitted in response to microwaves, and an article is made using a raw material which is used to manufacture ceramics, and an exothermic plate body is made of an exothermic element prepared by mixing with one or more selected from the group consisting of silicon carbide, ferrite and iron oxide, which includes preparing an article slip in a soil-mixed water state in such a way that a raw material used to manufacture ceramics and water are mixed and agitated; injecting an article slip in such a way that 1~60 minutes pass after the prepared article slip is injected into the gypsum mold; preparing an exothermic slip in such a way that an exothermic slip in a soil-mixed water state is prepared by mixing a weight ratio of 1:99~99:1 an article slip and an exothermic element; injecting an article slip in such a way that the prepared exothermic slip is injected again into the gypsum mold in which the article slip has been injected, and after 5~120 minutes pass, the exothermic body slip sinks downward within the earlier injected article slip and is placed in a whole into a shape of a plate body; and removing an article from a mold wherein after the above step, a non-hardened article slip in the soil-mixed water state in the gypsum mold and the exothermic body slip are removed, and 5~60 minutes pass, and the finished article is removed from the gypsum mold.

To achieve the above objects, according to a first embodiment of the present invention, there is provided an exothermic ceramic for microwaves, which includes a plate shaped exothermic body which is made of an exothermic raw material composition containing 30~70 part by weight of a ceramic raw material having a size of a fineness number of 20~250 meshes with respect to the total 100 part by weight of a composition, and 70~30 part by weight of an exothermic element having a size of a fineness number of 20~250 meshes containing one or more selected from the group consisting of silicon carbide, carbon, ferrite and iron oxide, which emit heat in response to microwaves; a forming article which is formed using a ceramic raw material so as to accommodate contents and includes a bottom which is arranged on the upper surface of the exothermic body, and a rim wall which extends upward integral from the rim of the body; a first protective layer which is formed by coating a glaze containing as a main ingredient silica and petalite on an outer surface of the forming article; and a second protective layer which is formed by integrally coating a glaze containing as a main ingredient silica and petalite on an inner surface of the forming article and an exposed upper surface of the exothermic body.

To achieve the above objects, according to a second embodiment of the present invention, there is provided an exothermic ceramic for microwaves, which includes a plate shaped exothermic body which is made of an exothermic raw material composition containing 30~70 part by weight of a ceramic raw material having a size of a fineness number of 20~250 meshes with respect to the total 100 part by weight of a composition, and 70~30 part by weight of an exothermic element having a size of a fineness number of 20~250 meshes containing one or more selected from the group consisting of silicon carbide, carbon, ferrite and iron oxide, which emit heat in response to microwaves; a forming article which is formed using a ceramic raw material so as to accommodate contents and includes a bottom arranged for the exothermic body to be placed on a lower surface, and a rim wall which extends upward integral from the rim of the body; a third protective layer which is formed by applying a glaze containing as a main ingredient silica and petalite on an inner surface of the forming article; and a fourth protective layer which is formed by integrally coating a glaze containing as a main ingredient silica and petalite on an outer surface of the forming article and an exposed lower surface of the exothermic body.

To achieve the above objects, according to a third embodiment of the present invention, there is provided an exothermic ceramic, which includes a forming article which is formed using a ceramic raw material and includes a bottom and a rim wall; a plate shaped exothermic body which is a plate shaped member attached to a lower surface or an upper surface of the bottom of the forming article and is made of an exothermic raw material composition containing 30~70 part by weight of a ceramic raw material having a size of a fineness number of 20~250 meshes with respect to the total 100 part by weight of a composition, and 70~30 part by weight of an exothermic element having a size of a fineness number of 20~250 meshes containing one or more selected from the group consisting of silicon carbide, carbon, ferrite and iron oxide, which emit heat in response to microwaves; a forming article which is formed using a ceramic raw material to accommodate contents and includes a bottom formed of an upper body layer and a lower bottom layer while being surrounded like being buried in the inside of the exothermic body, and a rim wall which integrally extends upward from the rim of the bottom; and fifth and sixth protective layers which are formed by coating a glaze containing at a main ingredient silica and petalite on the inner and outer surface of the forming article.

As a preferred feature of the present invention, the exothermic body further includes an exothermic protective layer formed by coating a glaze containing as a main ingredient silica and petalite on an outer surface thereof.

As another preferred feature of the present invention, the ceramic raw material is made of a raw material prepared by mixing one or more selected from the group consisting of clay, kaolin, silica, felspar, fetalite, mullite, white clay, blue ceramic clay, white ceramic clay, combined clay, Sanchung clay, pottery clay, ceramic clay and heat-resisting clay.

As further another feature of the present invention, the bottom of the forming article and the exothermic body have a thickness ratio of 30~70:70~30 with respect to the total 100 of thickness.

As still further another feature of the present invention, the bottom and the exothermic body are adhered by a junction layer, and the junction later is a junction raw material which contains one or more selected from the group consisting of bone ash, talc, silica, and petalite.

As still further another feature of the present invention, the exothermic body is formed in a plate shape having a predetermined size corresponding to the bottom of the forming article or is formed in a rod or grain shape provided multiple in number in a plane shape at intervals.

Advantageous Effects

The exothermic ceramic for a microwave oven according to the present invention provides advantages wherein since an exothermic element, for example, a silicon carbide, having an exothermic characteristic heated by microwaves is mixed at a predetermined ratio with a ceramic raw material, for example, clay or plastic clay, a manufacturing process is simple, whereupon a mass product is available, and an economic manufacturing and supply can be obtained.

In particular, since a product molding is available with the aid of a pressure injection molding, a press molding, an automatic and manual roller machine molding, etc., so it is possible to manufacture through various processes based on the type and size of a product, and a freedom in design can be enhanced with respect to a formed product as compared with a conventional technology, whereupon the present invention can provide useful effects, Since the exothermic ceramic according to the present invention uses an exothermic body composition made by appropriately mixing an exothermic element, for example, a silicon carbide, a carbon, a ferrite, an iron oxide, etc. having an exothermic characteristic heated by microwaves with a ceramic manufacturing body, for example, blue ceramic clay, white ceramic clay, combined clay, Sanchung clay, pottery clay, ceramic clay, heat-resisting clay, clay, white clay, soil, etc., thus providing an enhanced formability while minimizing a sense of difference that the exothermic element has, and a stability after forming can be enhanced.

The previously formed exothermic body formed in a plate shape is laced on an inner or outer side bottom of a forming article formed in a shape of a container, for example, a bowl or a plate as a ceramic manufacturing body and is burnt after coating a glaze, which makes it possible to maintain an integrally adhered state of the exothermic body and the forming article during a calcination procedure without using a separate adhesive or structure, thus enhancing an elegant exterior of the product. In addition, a manufacturing process is simple, which allows a mass production, thus obtaining an economical manufacturing and supply. As compared with the conventional technology, a freedom in design with respect to a formed product can be enhanced.

MODES FOR CARRYING OUT THE INVENTION

The method for manufacturing an exothermic ceramic for a microwave oven according to the present invention will be described. First, it is noted that the same components or parts are given the same reference numbers. During the description of the present invention, the detailed description on a known function or configuration will be omitted so as to prevent any misunderstanding.

The forming method used in the method for manufacturing an exothermic ceramic for a microwave oven according to the present invention may be categorized into a pressure injection forming method, a press forming method, and an automatic and manual roller machine forming method which are a spinning wheel forming method. Since the forming method is implemented by a known technology, the detailed descriptions thereon will be omitted. The raw material for manufacturing a ceramic which is a main material when forming the whole exterior of the article in the present invention is clay, plastic clay, soil, etc., and known blue ceramic clay, white ceramic clay, combined clay, Sanchung clay, pottery clay, ceramic clay, etc. may be used. Preferably, a heat-resisting raw material is used.

Here, the heat-resisting raw material may be a raw material containing various known heat-resisting components. As the widely used heat-resisting raw materials, there are Sanbaek clay (soil which is made by mixing at a predetermined ratio Sanchung clay and white clay and has black spots in a white raw material at 1230~1270° C., and is strong at heat and has a strong stickiness and can be used for various purposes), Sanchung clay (1200~1260° C., soil which is produced at a Sanchung region of South Kyungsang province in Korea and has big granules and red colors and are strong at heat and are generally used to manufacture tableware and big size of articles and allows to make good mood with heat and can be well mixed with other soils), and heat resisting clay (which is made by mixing a heat resisting component with clay and is strong at heat and is mainly used to manufacture Ttukbargi). Except for the above clays, a heat resisting raw material made by mixing ferrite which is a heat-resisting component, with clay may be used. It is preferred that the ceramic raw material in the present invention uses a heat-resisting raw material containing heat-resisting components. A raw material for manufacturing a ceramic, for example, blue ceramic clay, white ceramic clay, combined clay, Sanchung clay, pottery clay, ceramic clay, etc. may be used. Since these raw materials are implemented by the known technology, the detailed description thereon will be omitted.

Figure 1:
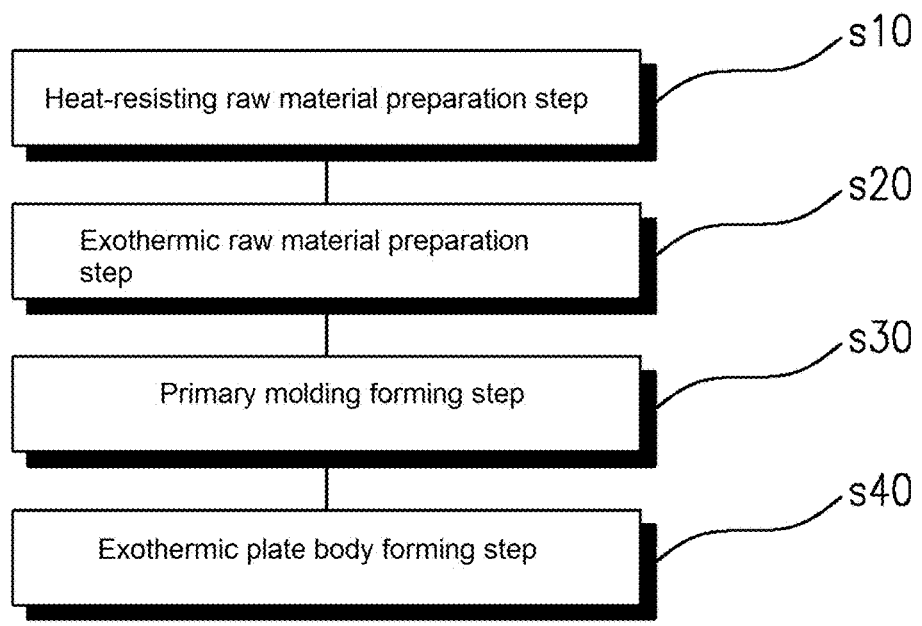
FIG. 1 is a schematic block diagram illustrating a method for manufacturing an exothermic ceramic for a microwave oven according to the present invention.

The method for manufacturing an exothermic ceramic for a microwave oven according to the present invention will be described with reference to FIG. 1.

The present invention is directed to a provision of a container type ceramic, for example, a plate or a bowl which allows to heat a food or a heating target in a microwave oven by using an exothermic raw material which is made by mixing a ceramic raw material made of a raw material (blue ceramic clay, white ceramic clay, combined clay, Sanchung clay, pottery clay, ceramic clay) used to manufacture ceramics including a heat-resisting raw material by mixing heat-resisting clay, Sanchung clay, Sanbaek clay or heat-resisting component and clay and an exothermic element combined with one or two of silicon carbide, carbon, ferrite and iron oxide. Namely, the method for manufacturing an exothermic ceramic for a microwave oven according to the present invention is directed to an article which defines the whole outer exterior and is implemented with a ceramic raw material used as a main material, and an exothermic raw material used to form an exothermic plate body which emits heat in response to microwaves from a microwave oven.

A ceramic raw material and an exothermic raw material which are main materials are prepared.

Here, the ceramic raw material may be a raw material used to manufacture ceramics, for example, blue ceramic clay, white ceramic clay, combined clay, Sanchung clay, pottery clay, ceramic clay, etc. In a preferred embodiment of the present invention, it may be prepared through agitation by adding 3~35 part by weight of water and 0.1~2 part by weight of sodium silicate with respect to the total 100 part by weight of a heat-resisting material (S10). Here, the heat-resisting raw material may be a raw material made by mixing heat-resisting clay, Sanchung clay and Sanbaek clay heat-resisting components with clay, which were described earlier.

The heat-resisting raw material is used by mixing 1~32 part by weight of water with respect to the total 100 part by weight of a mixture which is prepared by mixing at a weight ration of 3~7:7~3 the heat-resisting element, for example, the above described raw material and silicon carbide (S20).

If the ceramic raw material and the heat-resisting raw material are prepared in the above way, the whole exterior of an article is made with the above ceramic raw material (S30). The exothermic part is formed using the heat-resisting raw material (S40).

Meanwhile, it is preferred that the article made of the ceramic raw material is formed in a shape of a container configured to accommodate a heat cooking food. It is preferred that the exothermic portion is formed and has a wide surface area on the bottom of the article. In the present invention, with the prepared ceramic raw material, an exterior configuration of the article is formed by a press forming method, an automatic and manual roller machine forming method, and a pressure injection forming method. The exothermic plate body is formed using the thusly prepared exothermic raw material in a press forming method, an automatic and manual roller machine forming method and a pressure injection method in such a way that it is buried under the upper surface of the bottom or the lower surface of the bottom or the inside of the bottom of the first mold formed using the ceramic raw material, thus finishing the manufacturing thereof.

The ceramic which is a forming article has the following temperature change as in Table 1 based on the exothermic element inclusion ratio of the heating raw material and the heating time is 5 minutes

TABLE 1

| Ceramic raw material: exothermic element | Temperature |
| --- | --- |
| 65:35 | 230° C. |
| 60:40 | 270° C. |
| 55:45 | 300° C. |
| 50:50 | 400° C. |
| 45:55 | 550° C. |
| 40:60 | 350° C. |

* Heating time is 5 minutes (microwave oven-power consumption)

Referring to Table 1, it was confirmed that the optimum exothermic performance was obtained if the ceramic raw material and the exothermic element were mixed at a ratio of 45:55. It was confirmed that the exothermic performance was low if the ceramic raw material and the exothermic element were mixed at a ratio smaller than 65~:35~ or the ceramic raw material and the exothermic element were mixed at a ratio higher than 40~:60~.

Meanwhile, if the ceramic raw material and the exothermic element were mixed at a ratio of 45:55 in the component mixing of the exothermic raw material, the temperature change at room temperature was as in Table 2.

TABLE 2

| Time | Temperature |
|---|---|
| 5 minutes | 234° C. |
| 10 minutes | 138° C. |
| 20 minutes | 80° C. |
| 30 minutes | 55° C. |
| 40 minutes | 39° C. |

Temperature change based on time lapse at room temperature

The forming article is processed through a typical ceramic manufacturing process, for example, a drying, a shaping, a biscuit firing, a glaze coating, and a glaze firing (1200~1300° C.). Since this process is a known technology, the detailed description thereon will be omitted.

Figure 2:
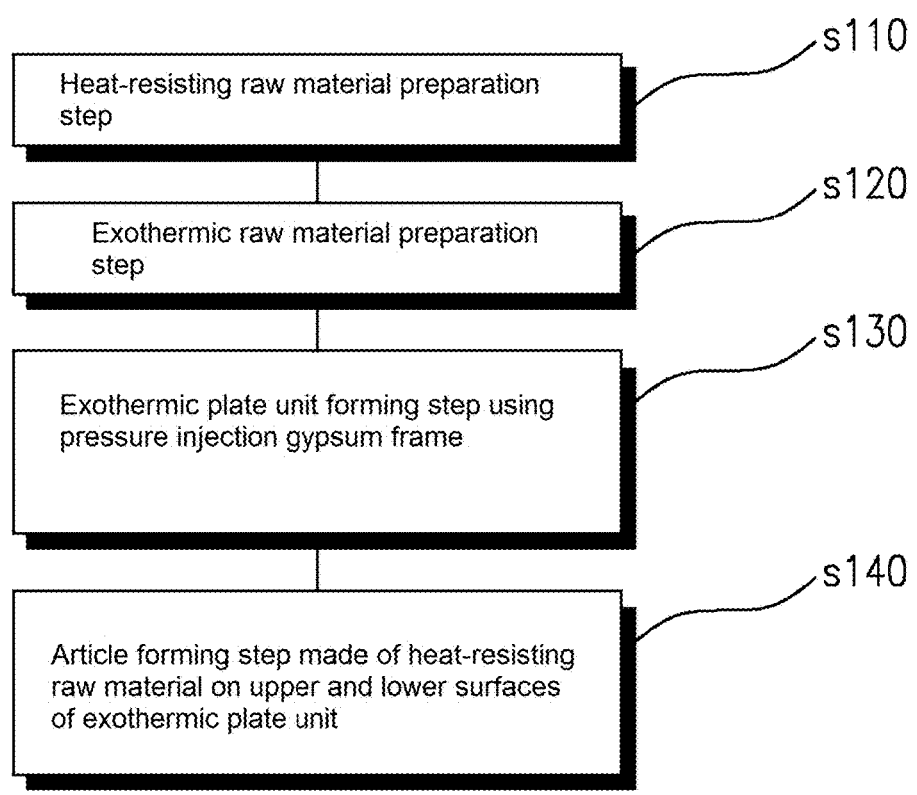
FIGS. 2 to 9 are schematic block diagrams for describing various embodiments according to the present invention.
Figure 11:
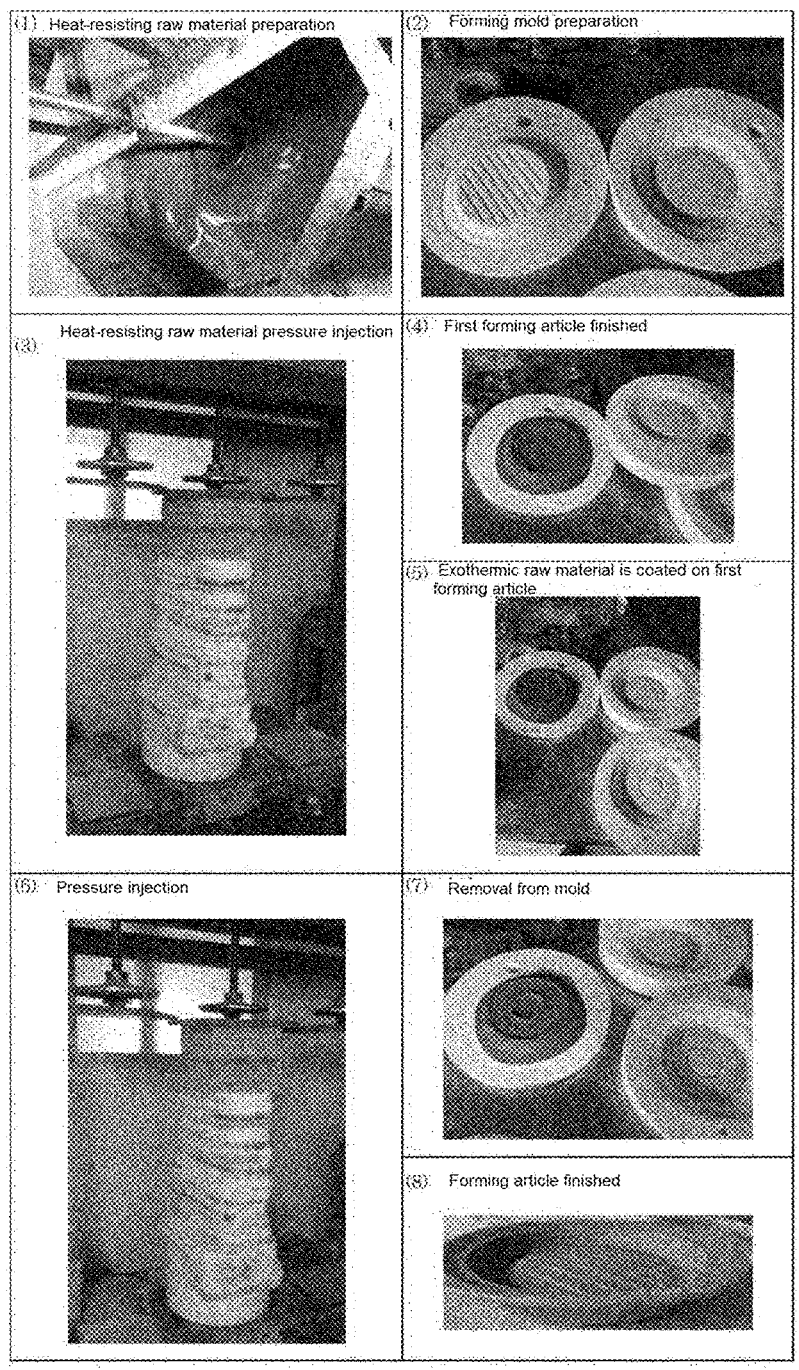
FIGS. 11 to 14 are work photos for describing key embodiments according to the present invention.

The preferred embodiments of the present invention based on the forming method will be described below. First, the first embodiment of the method for manufacturing an exothermic ceramic for a microwave oven using the pressure injection forming method will be described with reference to FIGS. 2 and 11. The ceramic raw material may be a known raw material, which is widely used to manufacture ceramics, for example, blue ceramic clay, white ceramic clay, combined ceramic clay, Sanchung clay, pottery clay, ceramic clay, etc. The present invention provides in a preferred embodiment the use of a heat-resisting raw material. The ceramic raw material of the present invention provides a ceramic raw material which is prepared by adding 3~35 part by weight of water and 0.1~2 part by weight with respect to the total 100 part by weight of a heat-resisting raw material and by agitating (S110). Here, the heat-resisting raw material is a raw material made by mixing heat-resisting clay, Sanchung clay and Sanbaek clay heat-resisting components with clay.

The exothermic raw material is prepared by mixing 1~32 part by weight of water with respect to the total 100 part by weight of a mixture which is prepared by mixing at a weight ratio of 3~7:7~3 the exothermic elements, for example, ceramic raw material and silicon carbide (S120).

An exothermic plate body is formed, wherein the exothermic raw material prepared in the above step accounts for 5~95% with respect to the bottom thickness of the finished forming article. Here, it is formed in such a way that the exothermic raw material is injected into a pressure injection gypsum frame for the formation of an exothermic plate. Here, since the pressure injection gypsum frame can be implemented by a known technology, the detailed description thereon will be omitted (S320).

The formed exothermic plate body is positioned in the pressure injection gypsum frame for an article formation and on an upper surface or a lower surface of the bottom of the forming article, and a ceramic raw material is injected and is dried for 5 to 60 minutes, thus finishing an article formation (S140).

Figure 3:
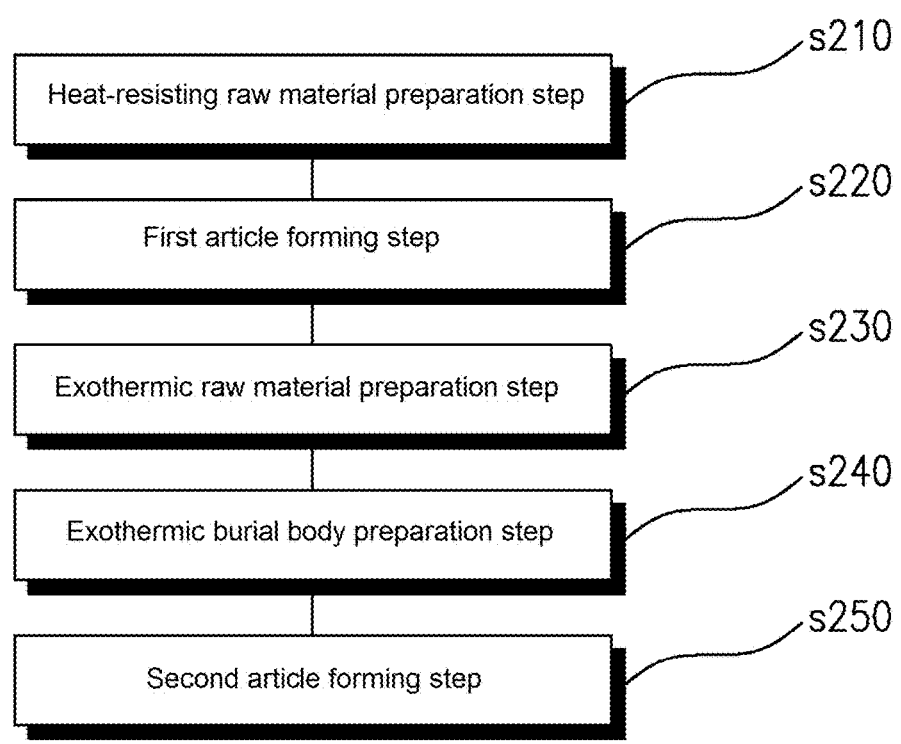

After the above embodiment, the second embodiment of the method for manufacturing an exothermic ceramic for a microwave oven using a pressure injection formation method will be described with reference to FIG. 3.

The ceramic raw material according to the present embodiment uses a raw material prepared by adding 3~35 part by weight of water and 0.1~2 part by weight of sodium silicate with respect to the total 100 part by weight of the heat-resisting raw material and by agitating it (S210). Here, the heat-resisting raw material may be a raw material, etc which is made by mixing heat-resisting clay, Sanchung clay and Sanbaek clay heat-resisting components with clay.

The first article formation is performed by injecting and forming a prepared ceramic raw material having a heat resistance into the first article gypsum frame of the pressure injection type. At this time, it is preferred that the first article is formed in a shape of a container to accommodate a heating cooking food (S220).

An exothermic raw material is prepared by mixing 1~32 part by weight of water with respect to the total 100 part by weight of a mixture prepared by mixing an exothermic raw material, for example, a ceramic raw material and silicon carbide at a weight ratio of 3~7:7~3 (S230).

Thereafter, an exothermic burial body is prepared by forming the prepared exothermic raw material into a shape of a circular plate, a polygonal shape or a mesh shape (S240).

The formed exothermic burial boy is positioned on the upper surface or lower surface of the bottom of the first article formed in a shape of the container, and is positioned in a second article gypsum frame of the pressure injection type, and a ceramic raw material is injected so as to bury the exothermic burial body, and a second article is formed so as to finish an article, thus finishing an article formation (S250).

Here, it is preferred that the second article is removed from the mold after it is dried for about 5~60 minutes in a state where the ceramic raw material is injected into the first article mold of the pressure injection type.

Figure 4:
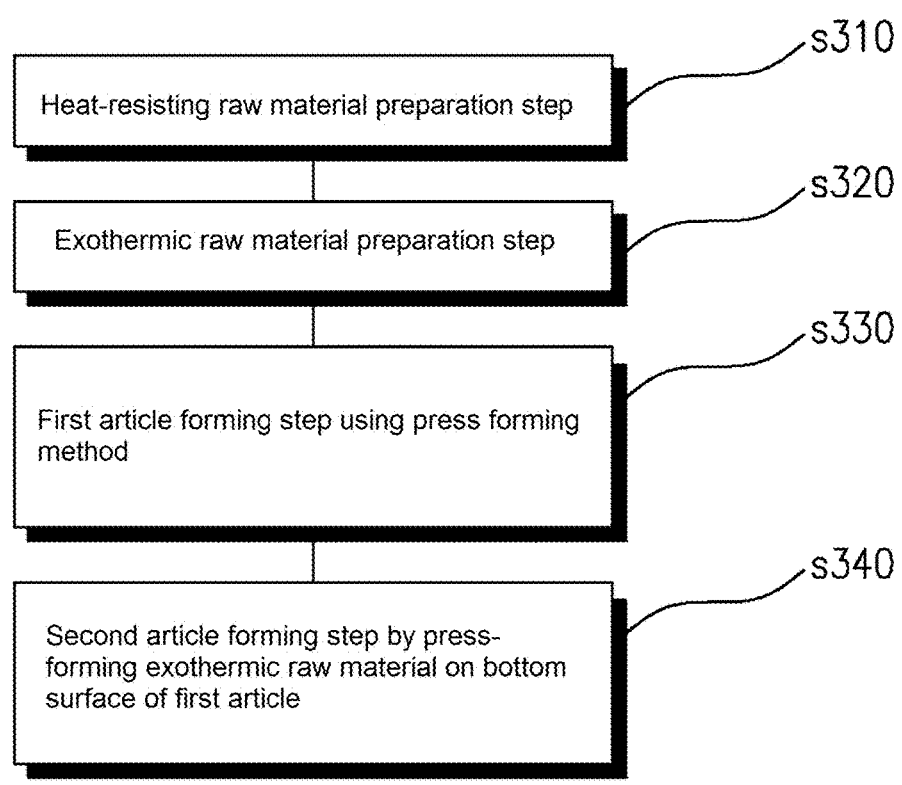
Figure 12:
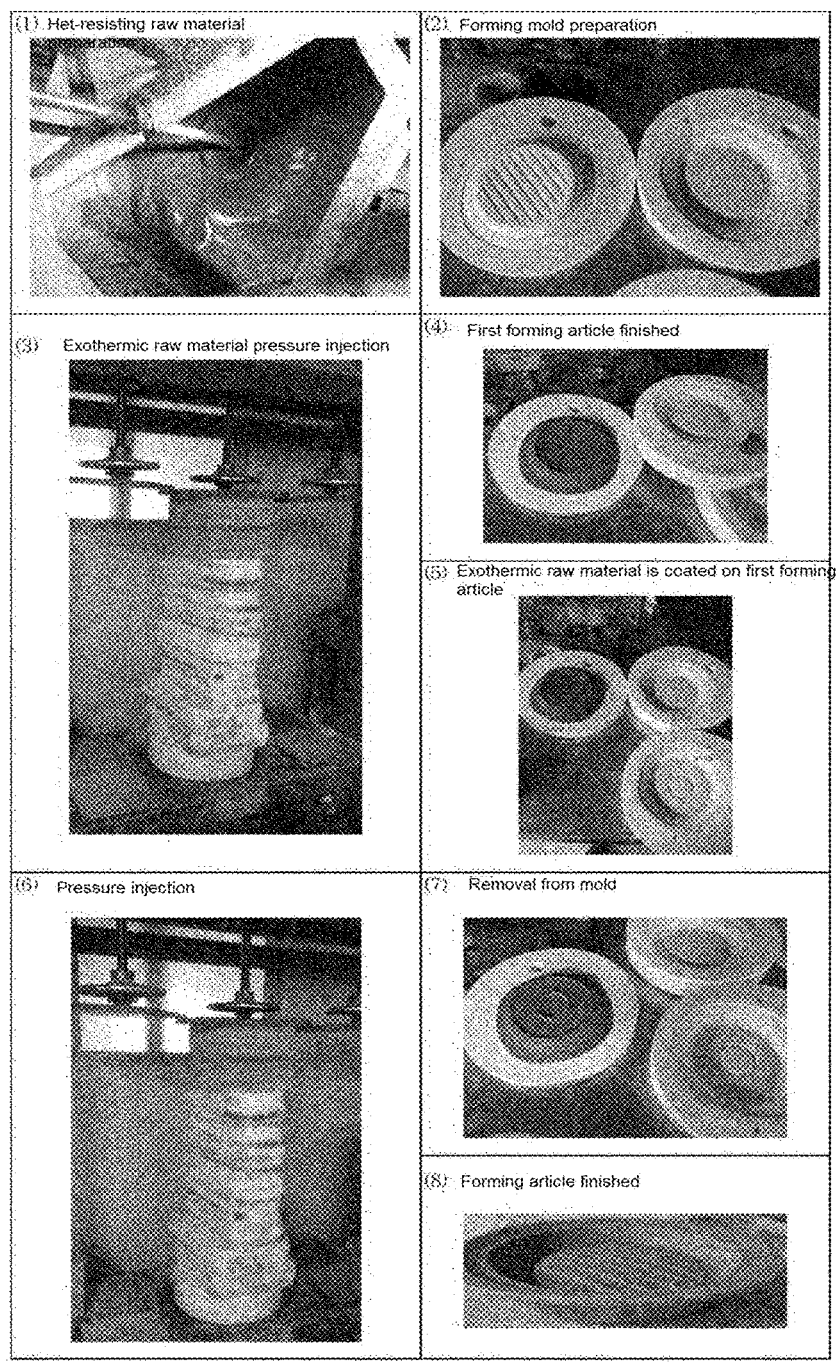

The first embodiment of the method for manufacturing an exothermic ceramic for a microwave oven using the press formation method will be described with reference to FIGS. 4 and 12.

The ceramic raw material is prepared by mixing 3~32 part by weight of water with respect to the total 100 part by weight of a heat-resisting raw material (S310). Here, the heat-resisting raw material is a raw material made by mixing heat-resisting clay, Sanchung clay and Sanbaek clay heat-resisting components with clay.

The exothermic raw material is prepared by mixing 1~32 part by weight with respect to the total 100 part by weight of a mixture which is made by mixing at a weight ratio of 3~7:7~3 the exothermic elements, for example, ceramic raw material and silicon carbide prepared in the above steps (S320).

The prepared ceramic raw material is placed on the first press mold of the press forming type, and a first article is formed (S330). At this time, the first article is formed in a shape of a container for accommodating a heat cooking food.

The exothermic raw material is placed by a predetermined amount on the upper surface or lower surface of the bottom of the formed first article and on the second press mold of the press forming type and then is press-formed. As a result, the second article is finished in such a way that the exothermic raw material defines an upper surface or lower surface of the bottom of the first article (S340).

Figure 5:
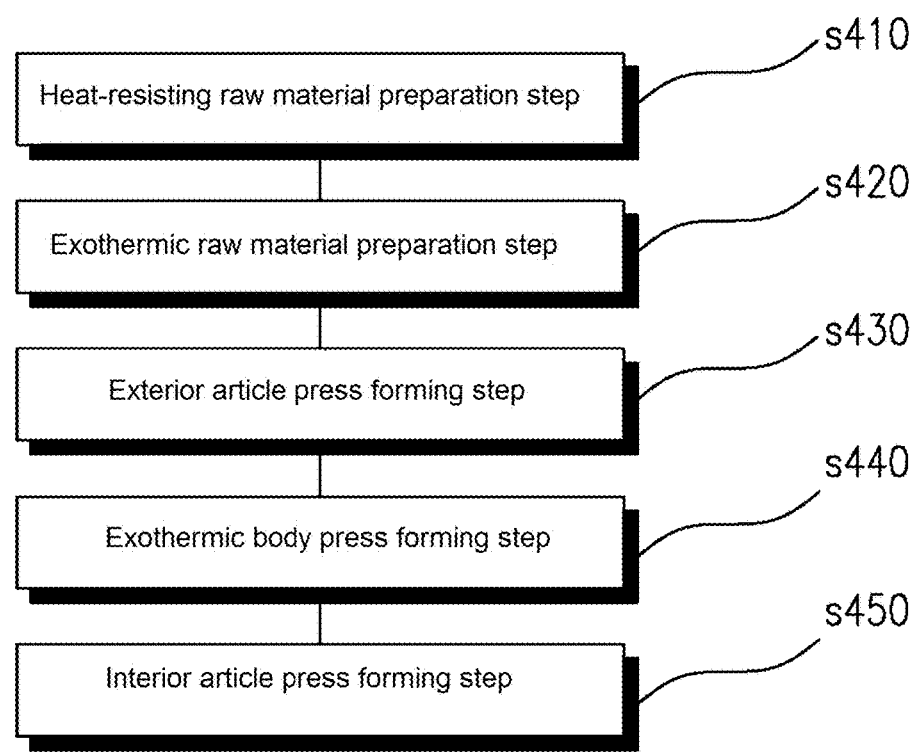

After the first embodiment of the press forming type, the second embodiment of the method for manufacturing an exothermic ceramic for a microwave oven using the press forming method will be described with reference to FIGS. 5 and 12.

First, the procedure for preparing ceramic raw materials will be described. A ceramic raw material is prepared by mixing 3~32 part by weight with respect to the total 100 part by eight of the earlier described heat-resisting raw material 100 (S410). Here, the heat-resisting raw material, like in the earlier description, may be a raw material prepared by mixing heat-resisting clay, Sanchung clay, Sanbaek clay heat-resisting components with clay.

An exothermic raw material is prepared by mixing 1~32 part by weight of water with respect to the total 100 part by weight of a mixture which is prepared in such a way that an exothermic element, for example, silicon carbide, is mixed at a weight ratio of 3~7:7~3 with the prepared ceramic raw material (S420).

The ceramic raw material prepared in the above step is filled into a first press mold and is press-molded, thus forming an external article which defines an exterior of the article (S430).

In addition, an exothermic body which is positioned to form an exothermic plate body is formed in such a way to fill an exothermic raw material into the inside of the formed exterior article and to press-form it (S440).

The ceramic raw material is filled into the inside of the external article and is press-formed, whereupon an interior article is formed, which defines an interior of the article with the exothermic body being buried, thus finishing the processes (S450).

The first embodiment of the method for manufacturing an exothermic ceramic for a microwave oven using an automatic and manual roller machine forming method which is a spinning wheel forming method will be described with reference to FIG. 6.

First, the ceramic raw material may be a raw material used to manufacture a ceramic, for example, blue ceramic clay, white ceramic clay, combined clay, Sanchung clay, pottery clay, ceramic clay, etc. In the present embodiment, it is preferred to use a heat-resisting raw material. Preferably, a ceramic raw material is prepared by mixing 3~35 part by weight of water with respect to the total 100 part by weight of a heat-resisting raw material and is processed in a vacuum-pug way (S510). Here, the heat-resisting raw material may be a raw material made by mixing heat-resisting clay, Sanchung clay, Sanbaek clay heat-resisting components with clay.

Thereafter, an exothermic raw material is prepared in such a way that 1~32 part by weight is mixed with respect to the total 100 part by weight of a mixture made by mixing at a weight ratio of 3~7:7~3 the prepared ceramic raw material with an exothermic element, for example, silicon carbide, and the mixture is processed in a vacuum-pug way (S520).

A first article is formed in such a way that the prepared ceramic raw material is roller-formed in an automatic and manual roller machine gypsum frame. At this time, it is preferred that the first article is formed in a shape of a container for keeping or storing a heat cooking food.

A second article is finished in such a way that the exothermic raw material, which was processed in a vacuum-pug way, is inputted into the inside of the first article and is processed with the automatic and manual roller machine, thus forming an exothermic inner wall. The exothermic inner wall may be formed and have a uniform thickness over the whole portions of the inner wall of the first article, but preferably it is formed on a bottom surface. In particular, it is preferred that the exothermic raw material, which was processed in a vacuum-pug way in the process of the second article, is inputted into the inside of the first article and is formed using the automatic and manual roller machine and is dried for 5~30 minutes and is removed from the mold.

Figure 6:
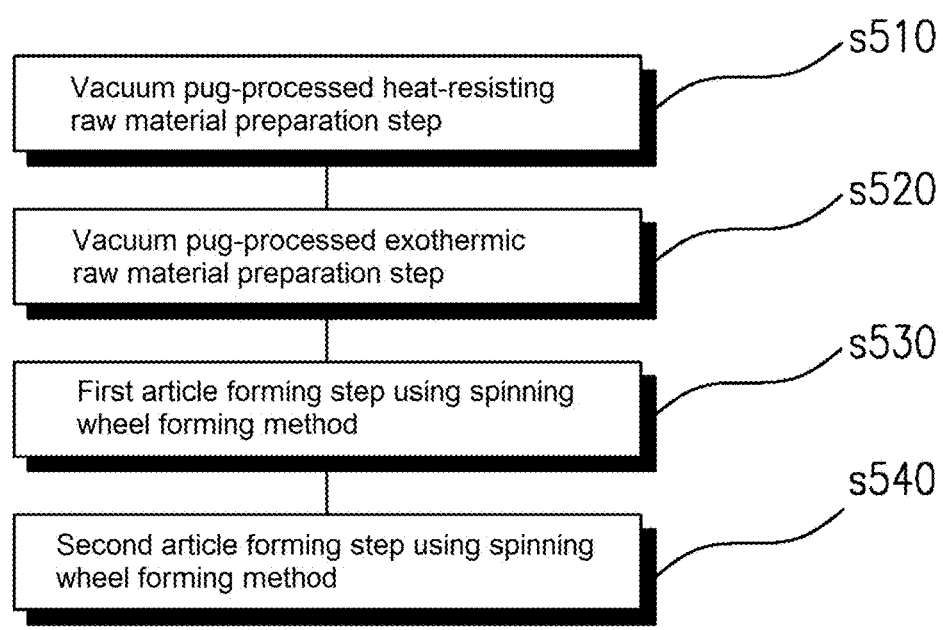

Meanwhile, it is possible to form a spinning wheel in such a way the exothermic raw material is not exposed to the outside in the embodiment in FIG. 6, namely, in such a way that the exothermic inner wall is buried by inputting a ceramic raw material into the inside of the second article.

Figure 7:
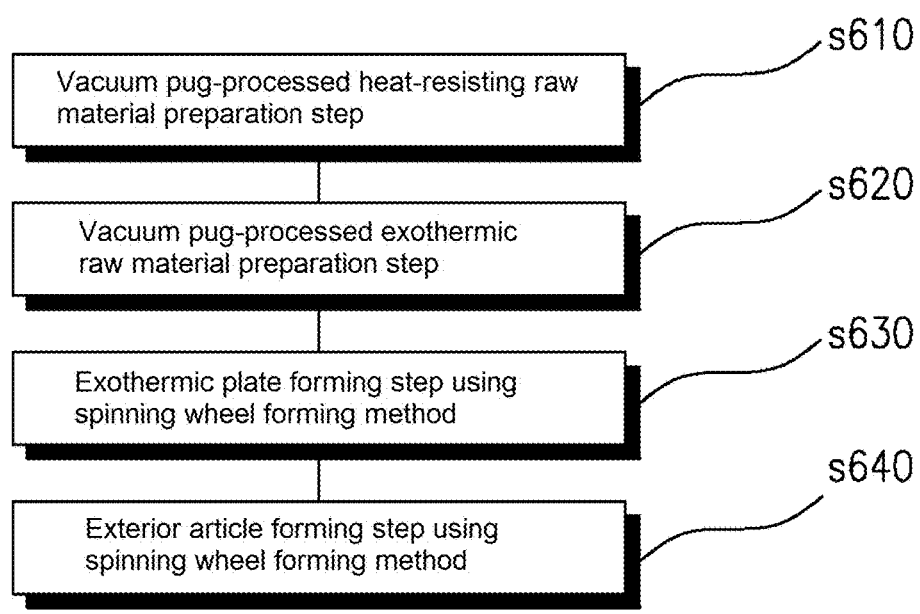
Figure 13:
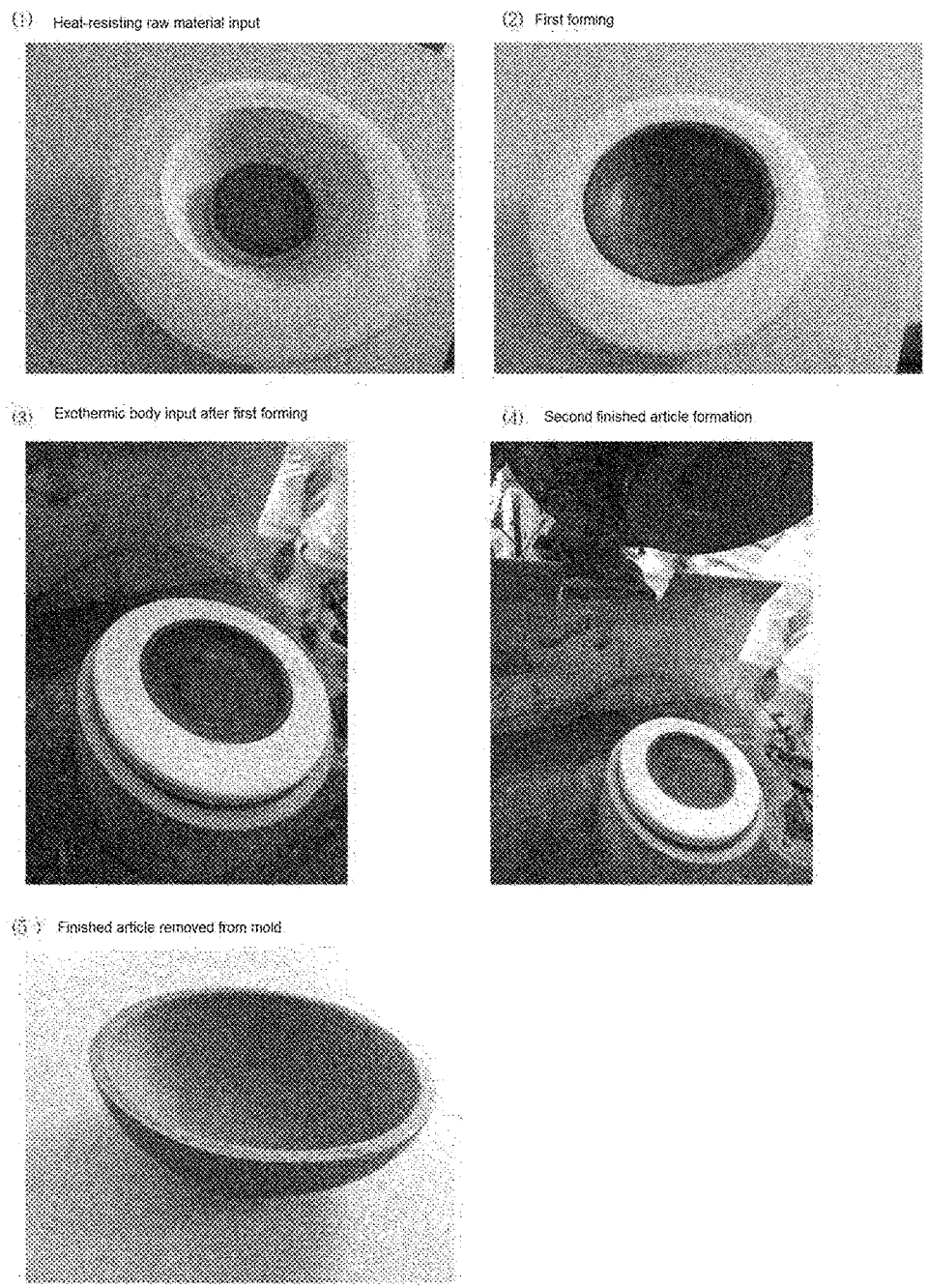

After the above embodiments, the second embodiment of the method for manufacturing an exothermic raw material for a microwave oven using a roller machine which is an automatic and manual roller machine forming type will be described with reference to FIGS. 7 and 13.

First, same as in the above embodiment, the ceramic raw material may be various raw materials to manufacture ceramics. Preferably, it uses a ceramic raw material which is prepared by mixing 3~35 part by weight with respect to the total 100 part by weight of a heat-resisting raw material and processing it in a vacuum-pug way (S610). Here, the heat-resisting raw material may be a raw material prepared by mixing heat-resisting clay, Sanchung clay, Sanbaek clay heat-resisting components with clay.

An exothermic raw material is prepared in such a way to mix 1~32 part by weight of water with respect to the total 100 part by weight of a mixture prepared by mixing at a weight ratio of 3~7:7~3 a ceramic raw material with a heat-resisting element, for example, silicon carbide and then to process it in a vacuum-pug way (S620).

Thereafter, a bottom portion, namely, an exothermic bottom of an article is formed by inserting the exothermic raw material prepared in the above step into the spinning wheel forming gypsum frame (S630).

The heat-resisting raw material is inputted into the upper surface of the formed exothermic bottom, thus finishing an exterior of the article through the formation performed using an automatic and manual roller machine (S640). At this time, it is preferred that the finished article is dried for 5~30 minutes in the automatic and manual roller machine gypsum frame and is removed from the mold.

Figure 8:
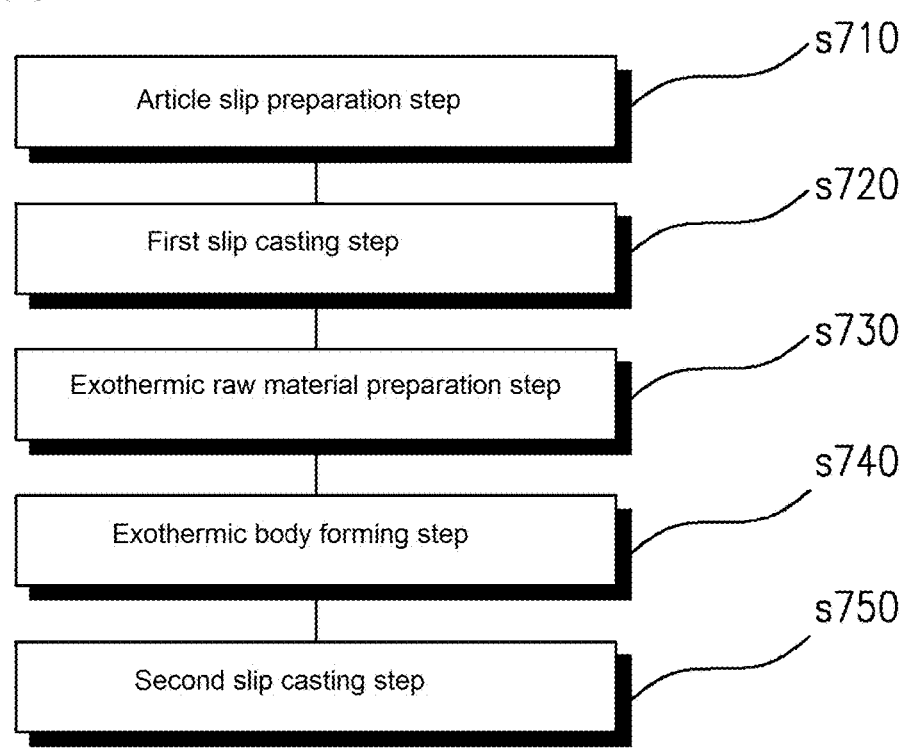
Figure 14:
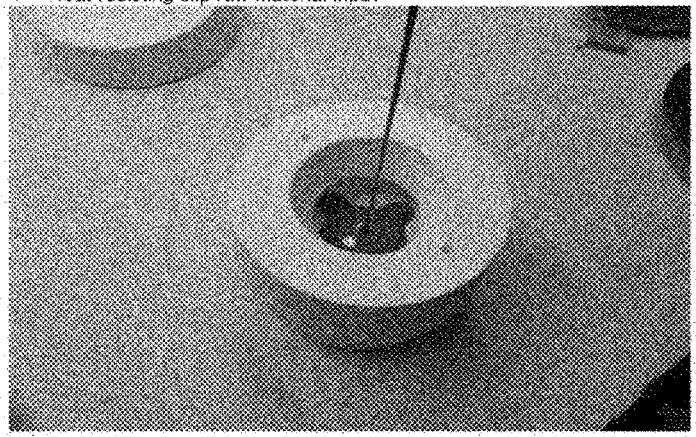
Figure 14:
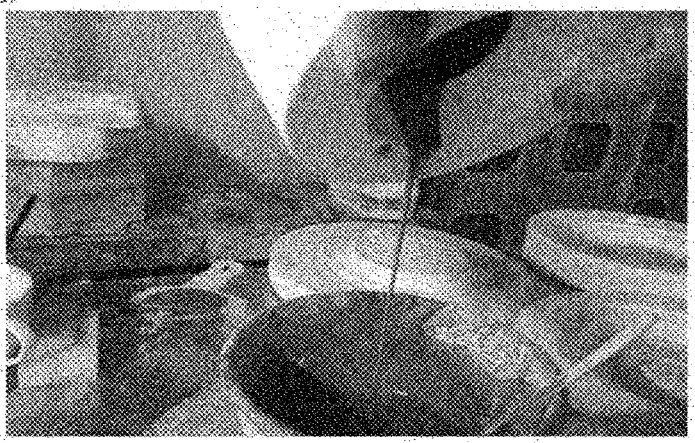
Figure 14:
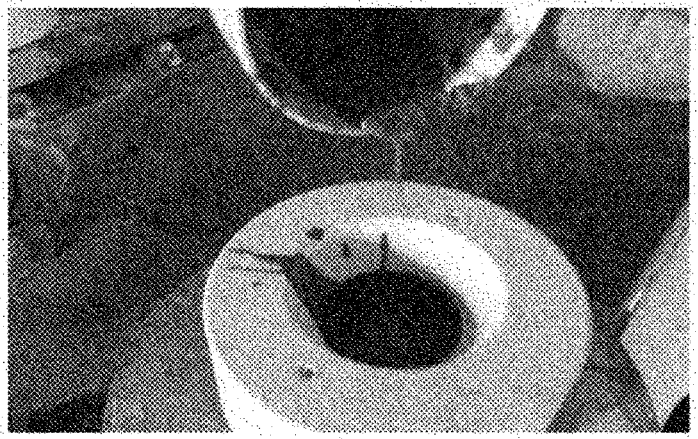

The first embodiment of the method for manufacturing an exothermic ceramic for a microwave oven based on a slip-casting forming method using a principle wherein a thickness is formed at a slip portion contacting with the gypsum since the gypsum absorbs moisture after a soil-mixed water state raw material is poured into the gypsum mold will be described with reference to FIGS. 8 and 14.

First, for the ceramic raw material, various known raw materials may be used to manufacture ceramics as in the earlier embodiment. Preferably, a ceramic raw material is prepared by mixing 3~32 part by weight of water with respect to the total 100 part by weight of a heat-resisting raw material, wherein the heat-resisting raw material may be preferably, a raw material prepared by mixing heat-resisting clay, Sanchung clay, combined clay heat-resisting components with clay.

An article slip in a soil-mixed water state is prepared by agitating the thusly prepared ceramic raw material with 0.01%~2% of water and sodium silicate (S710). Here, when the ceramic raw material and water and sodium silicate are inputted into an agitator and are agitated at a high speed, the mixture turns into a thinly diluted soil-mixed water state slip. The forming method using a soil-mixed, namely, slurry state slip is called an injection forming or a slip casting. Since the slip casting is a known technology, the detailed description thereon will be omitted.

A first slip casing is performed in such a way that the article slip prepared in the slip preparation step is injected into the article forming gypsum mold, and 5~60 minutes pass so as to form an exterior article, and a soil-mixed state article slip is taken out (S720). When the article slip is inputted into the gypsum mold, the gypsum absorbs moisture, and a thickness portion is formed at the slip contacting with the gypsum. As time passes, the thickness grows. The time that the article slip turns into a predetermined thickness is 5~60 minutes in the present embodiment.

In addition, when the article slip turns into a predetermined article thickness, the article slip which didn't turn into a solid state and remains in a soil-mixed water state is poured out by slanting or turning upside down the gypsum mold.

After the first slip casting step, an exothermic raw material is prepared by mixing at a weight ratio of 3~7:7~3 a ceramic raw material and an exothermic element, for example, silicon carbide (S730).

Thereafter, an exothermic body is formed in the inside of the gypsum mold wherein the article was formed in the step S702, using the prepared exothermic raw material (S740).

Meanwhile, when forming an exothermic body in the present embodiment, the following two methods are provided.

First, in the present embodiment, an exothermic body slip of a soil-mixed water type is prepared by mixing the prepared exothermic raw material and water. The exothermic body slip is injected into the gypsum mold wherein the article was formed in the step S702, and 5~60 minutes pass, and a solid state casting exothermic body is formed, and then the remaining exothermic body slip in a soil-mixed state is poured out to the outside of the gypsum mold, thus forming an exothermic body.

Second, a casting exothermic body is prepared by press-forming the prepared exothermic raw material or is formed in a shape of a plate using various known forming methods, and the casting exothermic body is placed at a predetermined position of the article in the gypsum mold.

If the exothermic body is being formed in the exothermic body forming step or is being fixed, a second slip casting step is performed, wherein the article is formed in such a way that the article slip is inserted into the gypsum mold where the exothermic body positions, and 5~60 minutes pass, and the article slip in a soil-mixed state is taken out (S750). Here, the article slip in the soil-mixed state can be taken out to the outside by slanting or turning upside down the gypsum mold.

After the second slip casting step, an article removal step is performed, wherein a finished article is removed from the gypsum mold after 5~60 minutes pass (S760).

As for the finished article formed by the slip casting forming method, an exterior article is formed by injecting into the gypsum mold using an article slip, and an exothermic body is positioned or formed at one side of the inner surface of the exterior article, and the article slip is injected again into the gypsum mold, whereupon the exothermic body is not exposed to the outside.

Figure 9:
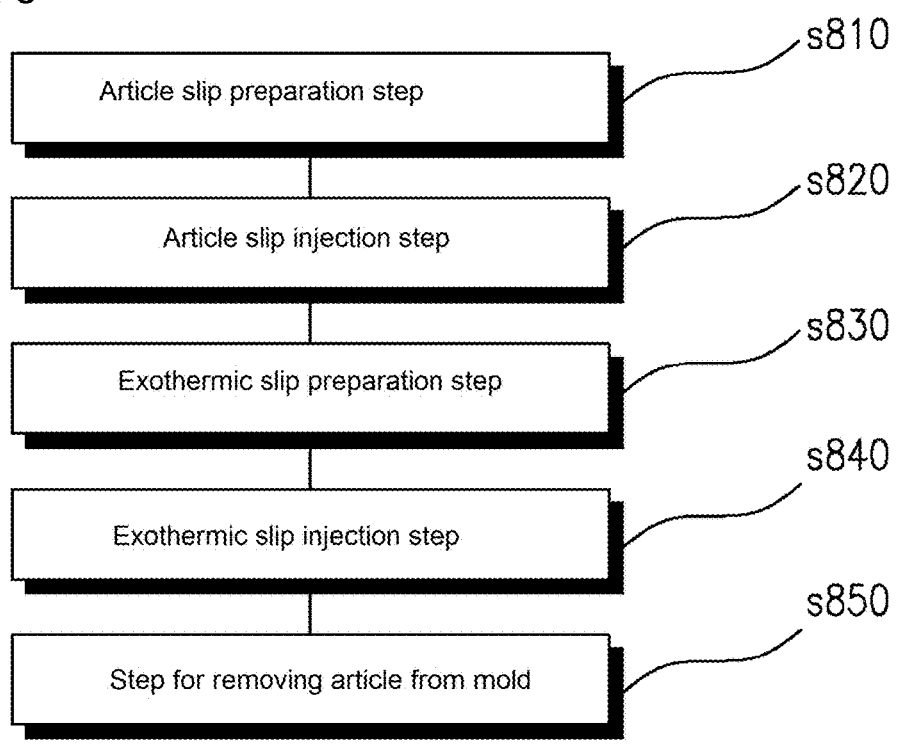

After the above embodiment, the second embodiment of the method for manufacturing an exothermic ceramic for a microwave oven using the slip casting forming method will be described. The present embodiment uses a forming method which is called an injection forming or slip casting which is a forming method using a soil-mixed, namely, slurry state slip. Since the above slip casting forming method can be implemented by a known technology, the detailed description thereon will be omitted. The present embodiment will be described with reference to FIG. 9.

The ceramic raw material is prepared by mixing 3~32 part by weight of water with respect to the total 100 part by weight of a heat-resisting raw material. As mentioned earlier, it is preferred that the heat-resisting raw material may be a raw material prepared by mixing heat-resisting clay, Sanchung clay, Sanbaek clay heat-resisting components with clay.

If the thusly prepared ceramic raw material and 0.01~2% of water and sodium silicate are inputted in the agitator and are agitated at a high speed, thus preparing a thinly diluted soil-mixed water state, namely, slip (S810). Here, if the ceramic raw material and water and sodium silicate are inputted into the agitator and are agitated at a high sped, a thinly diluted soil-mixed water state slip is obtained.

In the above step, an article slip injection is performed, wherein 1~60 minutes pass after the article slip in the soil-mixed state is injected into the gypsum mold (S820). Here, it is preferred that the gypsum mold may be various, but it is a plate or bowl shape.

After the above step, a soil-mixed state exothermic body slip is prepared by mixing at a weight ratio of 1:99~99:1 the article slip and an exothermic element, for example, silicon carbide (S830).

An exothermic slip injection is performed, wherein 5~120 minutes pass so that the prepared exothermic body slip is injected again into the gypsum mold wherein the article slip was injected, and the exothermic body slip mixed with the exothermic elements sinks downward in the previously injected article slip and positions in place (S840). If the exothermic body slip is injected into the gypsum mold in a state where the article formation slip was previously injected in the gypsum mold, the exothermic body sip for forming an exothermic body mixed with the exothermic elements sinks downward and positions in place, whereupon a predetermined thickness portion naturally grows as time passes.

After the above step, the article slip in the soil-mixed stare which was not hardened in the gypsum mold and the exothermic body slip are removed, and after 5~60 pass, the finished article is removed from the gypsum mold (S850).

Figure 10:
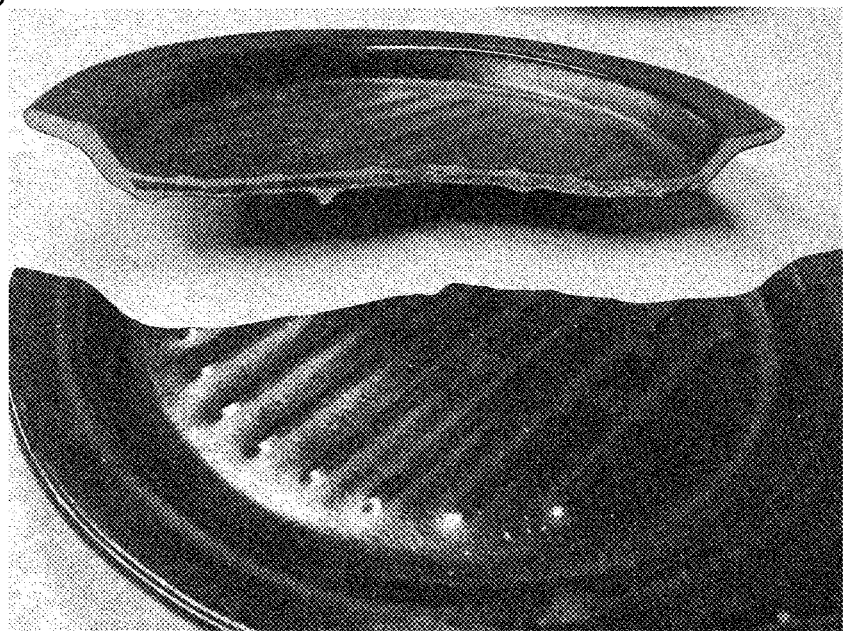
FIG. 10 is a photo of a cross section of an exothermic ceramic for a microwave oven according to the present invention.

FIG. 10, which has not been described above, is a photo of a cross section of a finished article, namely, a ceramic manufactured by the method for manufacturing an exothermic ceramic for a microwave oven according to the present invention, wherein according to the bottom portions of the ceramic, the ceramic raw material in a bright color is formed of upper and lower layers, and an exothermic plate body formed of an exothermic raw material in a dark color is formed between them.

Meanwhile, if the exothermic plate body formed using an exothermic raw material is formed on the upper surface of the finished article, namely, the article is formed in a shape of a dish-like container, and the exothermic plate body is positioned at on inner surface of the bottom of the container, the components of the exothermic raw material forming the exothermic plate body may leak outside during heating, whereupon it is preferred that the exothermic plate body is prevented from exposing to the outside by coating ceramic (silica sol) or PTFE (Polytetrafluoroethylene, ETFE; Ethylene TetrafluoroEthylene). Since this ceramic coating or fluorine coating can be implemented in a known technology, the detailed description thereon will be omitted.

The exothermic ceramic according to the present invention will be described with reference to the accompanying drawings. First, it is noted that the same component elements or parts are given the same reference numbers.

Figure 15:
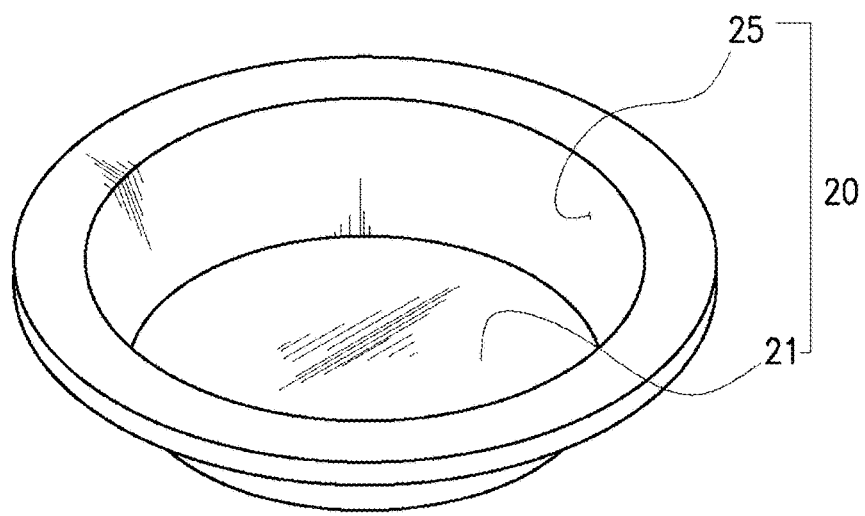
FIG. 15 is a perspective view illustrating an exothermic ceramic according to the present invention.

FIG. 15 is a perspective view illustrating an exothermic ceramic according to the present invention. In the drawings, a microwave exothermic ceramic is shown, which is formed in a shape of a container, for example, a plate or a bowl so as to accommodate a food, a heating target, etc.

Figure 16:
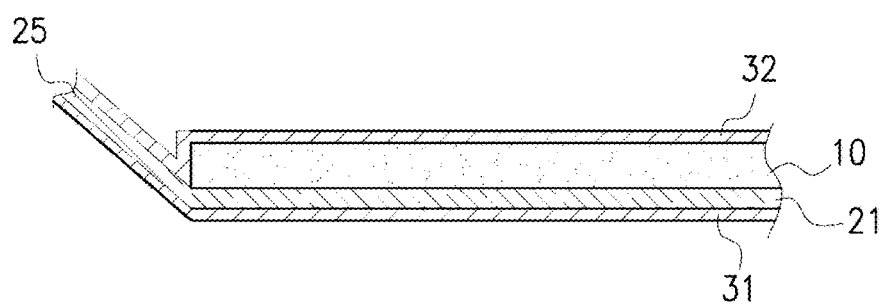
FIG. 16 is a partial cross sectional view for describing a configuration of an exothermic ceramic according to an embodiment of the present invention.

FIG. 16 is a partial cross sectional view for describing a configuration of the exothermic ceramic according to the present invention. In the drawing, a microwave exothermic ceramic is shown, which includes a forming article 20 formed of a bottom 21 and a side wall 25, and an exothermic body 10 provided on the top of the bottom 21 which forms the forming article 20.

Figure 17:
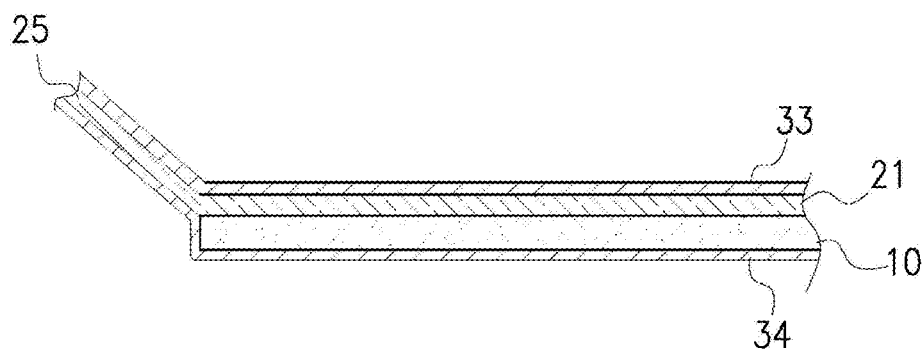
FIG. 17 is a partial cross sectional view for describing a configuration of an exothermic ceramic according to another embodiment of the present invention.

FIG. 17 is a partial cross sectional view for describing a configuration of an exothermic ceramic according to another embodiment in FIG. 16. In the drawing, a microwave exothermic ceramic is shown, which includes a forming article 20 formed of a bottom 21 and a side wall 25, and an exothermic body 10 provided on the lower surface of the bottom 21 which forms the forming article 20.

Figure 18:
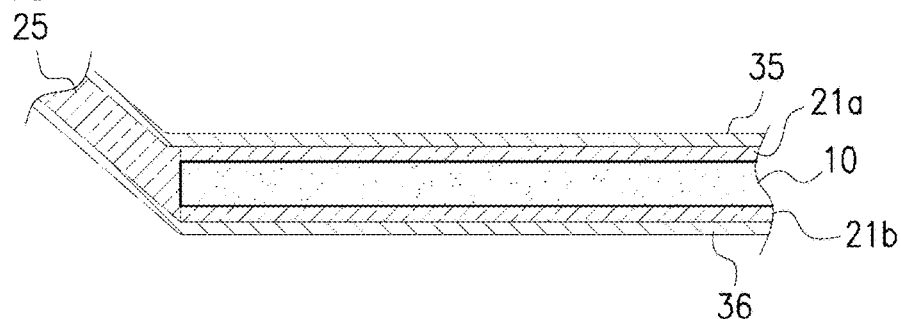
FIG. 18 is a partial cross sectional view for describing a configuration of an exothermic ceramic according to further another embodiment of the present invention.

FIG. 18 is a partial cross sectional view for describing a configuration of an exothermic ceramic according to further another embodiment in FIG. 16. In the drawing, a microwave exothermic ceramic is shown, which includes a forming article 20 formed of a bottom 21 and a side wall 25, and an exothermic body 10 buried in the inside of the bottom of the forming article 20.

Figure 19:
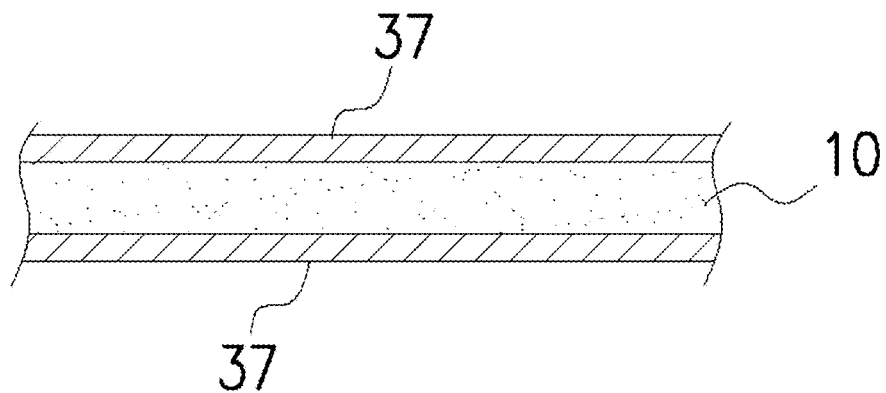
FIG. 19 is a cross sectional view illustrating a modified embodiment of an exothermic body according to the present invention.

FIG. 19 is a cross sectional view illustrating a modified embodiment of the exothermic body according to the present invention. In the drawing, a configuration of an exothermic body 10 is shown, which is covered by an exothermic protection layer 37 on an outer surface.

The embodiment of the exothermic ceramic for a microwave according to the present invention will be describe with reference to the accompanying drawings. First, the ceramic raw material used to form the forming article 20 which is a common element constituting the exothermic ceramic for microwaves according to the present invention and the exothermic raw material for forming the exothermic body 10 which is heated by the emission of the microwaves will be described.

First, the ceramic raw material forming the forming article may be a known raw material including clay to manufacture ceramics. Except for a clay (chemical formula: $Al_2O_3 \cdot SiO_2 \cdot 2H_2O$) which is an assembly of minerals containing, as a main component, fine natural alumina or silicate including a ceramic powder, heat-resisting clay, blue ceramic clay, combined clay, Sanchung clay, pottery clay, ceramic clay, white clay, etc. may be used or a raw material containing kaolin, silica, felspar, fetalite, mullite component may be used.

In the present invention, the ceramic raw material may be preferably a raw material which contains a heat-resisting component. For example, there are Sanbaek clay (soil which is made by mixing at a predetermined ratio Sanchung clay and white clay and has black spots in a white raw material at 1230~1270° C., and is strong at heat and has a strong stickiness and can be used for various purposes), Sanchung clay (1200~1260° C., soil which is produced at a Sanchung region of South Kyungsang province in Korea and has big granules and red colors and are strong at heat and are generally used to manufacture tableware and big size of articles and allows to make good mood with heat and can be well mixed with other soils), and heat resisting clay (which is made by mixing a heat resisting component with clay and is strong at heat and is mainly used to manufacture Ttukbargi). Except for the above clays, a heat-resisting raw material mixed with ferrite, which is a heat-resisting component, and clay may be used. Namely, the raw material used to manufacture ceramics in the present invention is preferably a raw material which contains heat-resisting materials, but may include, but is not limited to, one or a combination of at least two of clay, kaolin, silica, felspar, fetalite, mullite, white clay, blue ceramic clay, white ceramic clay, combined clay, Sanchung clay, pottery clay, ceramic clay, and heat-resisting clay, which are known clays used to manufacture ceramics.

In summary, the ceramic raw material according to the present invention may be a raw material including clay which is used to manufacture ceramics. It does not matter if known ceramic raw materials are used.

Second, the exothermic raw material used to form the exothermic body 10 may be configured to formability and exothermic characteristic in such a way to appropriately mix the earlier described ceramic raw material with the exothermic elements which are able to generate heat in response to the emission of microwave.

The exothermic elements of the present invention may be any of silicon carbide, ferrite, iron oxide and carbon or a combination of at least two of them and may have a size of a fineness number of 20~25 meshes.

Silicon carbide, ferrite, iron oxide and carbon, which are components in general used as exothermic elements, generate heat based on a radio absorption exothermic principle at a resistive membrane, of which silicon carbide is a hard-to-dissolve compound indicated in a chemical formula of Sic and has a high hardness and decomposition temperature and conductivity and is called a ferrite and has a polycrystal structure. In addition, the iron oxide is a compound of iron and oxygen and may be produced in nature in a form of hematite and magnetite.

Meanwhile, the forming article 20 and exothermic body 10 in the present invention are formed in the conventional ceramic formation method. As the above known ceramic formation method, there are press formation, automatic and manual roller machine formation, pressure injection formation and slip casting formation methods.

In addition, the exothermic ceramic for microwaves according to the present invention provides that the bottom 21 and the exothermic body 10 have a thickness ratio of 30~70:70~30 if it is assumed that the thickness of each of the bottom 21 of the forming article 20 and the exothermic body 10 is 100.

The exothermic ceramic for microwaves according to an embodiment of the present invention will be described. The exothermic ceramic for microwaves according to the present invention includes, but is not limited to, a forming article 20 having a formed space at an inner surface so as to store contents, and an exothermic body 10 provided on the bottom of the forming article 20.

The forming article 20 is formed using a ceramic raw material and in a shape of a container, for example, a plate or a bowl, so as to accommodate a food or a heating target and includes a flat bottom 21, and a rim wall 25 which extends upward integral from the rim of the bottom 21 and is configured to prevent the heating target from moving or escaping to the outside of the bottom 21. Here, as long as the forming article 20 is configured in any shape to accommodate a food or a heating target, various shapes and sizes may be acceptable.

The exothermic body 10 may be made by mixing at a predetermined ratio the ceramic raw material and the exothermic element which generates heat in response to microwaves. As the exothermic body 10, the present invention uses a composition which is made by mixing 30~70 part by weight of a ceramic raw material having a size of a fineness number of 20~25 meshes with respect to the total 100 part by weight, and 70~30 part by weight of an exothermic element which has a size of a fineness number of 20~250 meshes including one or more selected from the group consisting of silicon carbide, carbon, ferrite, and iron oxide which emit heat in response to the emission of microwaves.

This mixed composition may be mixed with water and may be pasted and may be formed into a flat plate shape with a predetermined size corresponding to the bottom 21 of the forming article 20 or may be formed into a lattice shape on the top of the bottom 21 or may be formed into a rod shape and provided multiple in number in a plane shape with intervals between them and may be formed into a shape of circular or polygonal grains with intervals between them.

Meanwhile, a glaze containing as a main ingredient silica; SiO$_2$ called silica and petalite is coated on an outer surface of the forming article 20, thus forming a first protective layer 31, and a glaze containing as a main ingredient Silica and petalite is formed integral on an inner surface of the forming article 20 and an exposed upper surface of the exothermic body 10, thus forming a second protective layer 32.

In summary, in the exothermic ceramic for microwaves according to a first embodiment of the present invention, the first protection layer 31 positions on a lower surface which is defined at the lower most side when viewing in FIG. 16, and a bottom 21 and the rim wall 25 which form the forming article 20 position on the upper surface of the first protective layer 31. The exothermic body 10 positions on the upper surface of the bottom 21, and the second protective layer 32 positions on the upper surface of the exothermic body 10 and on the upper surface of the rim wall 25 of the forming article 20.

Meanwhile, the exothermic body 10 in the exothermic ceramic for microwaves according to a first embodiment of the present invention may further include an exothermic protective layer 37 formed by coating a glaze on its outer surface, wherein the glaze contains as a main ingredient silica and petalite. The exothermic body 10 including the exothermic protective layer 37 may be manufactured separate and may be used in a type wherein burning is completed. In this case, it is engaged integral on the bottom 21 with the aid of the second protective layer 21.

In a state where the exothermic body 10 and the forming article 20 are previously formed and dried, it may be possible to form a junction layer (not illustrated) between the exothermic body 10 and the forming article 20 and then to adhere them. It is preferred that the junction layer is a resin for junction, namely, a junction resin which contains one or more selected from the group consisting of bone ash, talc, silica, and petalite.

The exothermic ceramic for microwaves according to another embodiment of the present invention will be described. The exothermic ceramic for microwaves according to the present embodiment may include, but is not limited to, a forming article 20 formed to have a space at an inner surface to accommodate contents; and an exothermic body 10 provided on the bottom of the forming article 20. This configuration is same as the configuration of the first embodiment, so the same components will be given the same reference numbers, and the detailed descriptions will be omitted Referring to FIG. 17, the forming article 20 is formed of a bottom 21 and a rim wall 25 which are formed at an inner side so as to accommodate heating targets. The exothermic body 10 is provided at a lower surface of the bottom 21.

The exothermic body 10 may be made of a composition prepared by mixing 30~70 part by weight of a ceramic raw material having a size of a fineness number of 20~250 meshes, and 70~30 part by weight of an exothermic element having a size of a fineness number of 20~250 meshes containing one or more selected from the group consisting of silicon carbide, carbon, ferrite and iron oxide. The exothermic body 10 may be formed in a flat plate shape sized corresponding to a lower side of the bottom 21 of the forming article 20 or may be formed in a lattice shape or may be formed in a shape of rods which are provided multiple in number at regular intervals in a plane shape or may be formed in circular or polygonal shape grains which are arranged at intervals.

A glaze containing as a main ingredient silica and petalite is coated on an inner surface of the forming article 20, thus forming a third protective layer 33. A glaze containing as a main ingredient silica and petalite is coated integral on an outer surface of the forming article 20 and on an exposed lower surface of the exothermic body 10, thus forming a fourth protective layer 34.

In summary, as for the exothermic ceramic for microwaves according to another embodiment of the present invention, a fourth protective layer 34 is formed on a lower surface which position at the lower most side when viewing in FIG. 17, and the exothermic body 10 positions on the upper surface of the fourth protective layer 34, and the bottom 21 of the forming article 20 positions on the upper surface of the exothermic body 10, and a third protective layer 33 positions on the upper surface of the bottom 21.

Meanwhile, the exothermic body 10 in the exothermic ceramic for microwaves according to another embodiment of the present invention may further include an exothermic protective layer 37 formed by coating on its outer surface a glaze containing as a main ingredient silica and petalite. The exothermic body 10 including such as exothermic protective layer 37 may be used after it is manufactured separate and is burnt. The exothermic body 10 is engaged integral to a lower surface of the bottom 21 by means of the fourth protective layer 34.

In addition, it is possible that the exothermic ceramic 10 and the forming article 20 can be previously formed and dried, and then a junction layer (not illustrated) can be adhered between the exothermic body 10 and the forming article 20.

The exothermic ceramic for microwaves according to further another embodiment of the present invention will be described. The exothermic ceramic for microwaves according to the present embodiment may include, but is not limited to, a forming article 20 having a formed space at an inner side to accommodate contents; and an exothermic body 10 provided on the bottom side of the forming article 20. Since the above configuration is same as in the first embodiment, the same components are given the same reference numbers, and the detailed descriptions will be omitted.

Referring to FIG. 18, the forming article 20 is formed of a bottom 21 and a rim wall 25 which are configured in their inner sides to accommodate a food or a heating target. The exothermic body 10 is buried in the inside of the bottom 21.

In order for the exothermic body 10 to be buried inside, the forming article 20 may include, but is not limited to, a bottom 21 formed of an upper bottom layer 21a and a lower bottom layer 21b with an interval between them in upward and downward directions; and a rim wall 25 which extends integral upward from the rim of the bottom 21.

The exothermic body 10 may be made of a composition prepared by mixing 30~70 part by weight of a ceramic raw material having a size of a fineness number of 20~250 meshes with respect to the total 100 part by weight with 70~30 part by weight of an exothermic element having a size of a fineness number of 20~250 meshes containing one or more selected from the group consisting of silicon carbide, carbon, ferrite and iron oxide which may emit heat in response to microwaves. The exothermic body 10 may be formed in a flat plate shape between an upper bottom layer 21a and a lower bottom layer 21b which form a bottom 21 of the forming article 20 or may be formed in a lattice shape or may be formed in a shape of rods which are provided multiple in number in a plane shape at intervals between them or may be formed in a shape of circular or polygonal grains disposed at intervals.

Meanwhile, a glaze containing as a main ingredient silica and petalite is coated on an inner surface of the forming article 20, thus forming a fifth protective layer 35, and a glaze containing as a main ingredient silica and petalite is coated on an outer surface of the forming article 20, thus forming a sixth protective layer 36.

In summary, in the exothermic ceramic for microwaves according to further another embodiment of the present invention, a sixth protective layer 36 positioned at the lower most portion when viewing in FIG. 18, and a lower bottom layer 21b of the bottom 21 forming the forming article 20 positions on the upper surface of the sixth protective layer 36, and the exothermic body 10 positions on the upper surface of the lower bottom layer 21b, and the upper bottom layer 21a of the bottom 21 positions on the upper surface of the exothermic body 10, and a fifth protective layer 35 positions on the upper surface of the upper bottom layer 21a.

Meanwhile, in the exothermic ceramic for microwaves according to further another embodiment of the present invention, the exothermic body 10 may further include an exothermic protective layer 37 which is formed by coating on its outer surface a glaze containing as a main ingredient silica and petalite.

The operation of the exothermic ceramic for microwaves according to the present invention will be described below.

The exothermic body of the present invention was heated for 5 minutes in a microwave based on a mixed ratio of the ceramic raw material and the exothermic element and showed a temperature change as seen in Table 3 below.

TABLE 3

| Ceramic raw material: Exothermic element | Temperature (° C.) |
| --- | --- |
| 80:20 | 210 |
| 70:30 | 250 |
| 60:40 | 300 |
| 50:50 | 400 |
| 40:60 | 550 |
| 30:70 | 350 |
| 20:80 | 200 |

Referring to Table 3, it was confirmed that the optimum exothermic performance was obtained when mixing at a ratio of 40:60 with respect to the total 100. When the ceramic raw material and the exothermic element were mixed at a mixing ratio smaller than 70:30 or if the ceramic raw material and the exothermic element were mixed at a mixing ratio higher than 20:80, it was confirmed that the exothermic performance was significantly lowered.

Meanwhile, in case of the exothermic body wherein a ceramic raw material and an exothermic element are mixed at a ratio of 40:60 in terms of the mixing of the components of the exothermic raw materials, the temperature change at a room temperature (20~25° C.) is shown in Table 4 below.

TABLE 4

| Time | Temperature (° C.) |
| --- | --- |
| 5 min | 234 |
| 10 min | 138 |
| 20 min | 80 |
| 30 min | 55 |
| 40 min | 39 |

* Temperature change at room temperature as time passes

In the thusly constituted exothermic ceramic for microwaves according to the present invention, the exothermic element which has an exothermic operation with the aid of microwaves does not have any cohesion, so it is hard to be formed. In the present invention, an exothermic body 10 is formed using an exothermic element prepared by mixing such an exothermic element with a ceramic raw material, and the above exothermic body 1 may be applied to the bottom 21 of the forming article 20, thus providing a mass production based on the secured good formability. Since the exothermic body 10 is formed integral with the forming article 20, a high design freedom can be obtained in terms of the designing of a product.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. A method for manufacturing exothermic ceramics for a microwave oven wherein heat can be emitted in response to microwaves, and an article is made using a raw material which is used to manufacture ceramics, and an exothermic plate body is made of an exothermic element prepared by mixing with one or more selected from the group consisting of silicon carbide, ferrite and iron oxide, comprising;
preparing a ceramic raw material in such a way to mix and agitate 3~35 part of water with respect to the total 100 part of a raw material used to manufacture ceramics;
preparing an exothermic raw material in such a way to mix 1~32 part by weight of water with respect to the total 100 part by weight of a mixture which is prepared by mixing the ceramic raw material and the exothermic element at a weight ratio of 3~7:7~3;
forming a main body wherein an exterior of an article is formed, wherein the article is formed using the above prepared ceramic raw material by any forming method among a press forming method, an automatic and manual roller machine forming method, a pressure injection method, and a slip casting formation method; and
forming an exothermic plate body wherein a plate body is formed by any of a press formation method, an automatic and manual roller machine formation method, a pressure injection formation method and a slip casting formation method so that the exothermic plate body can be formed using the prepared exothermic raw material on an upper surface or lower surface of the bottom of the body or can be buried inside the bottom thereof.

2. A method for manufacturing exothermic ceramics for a microwave oven wherein heat can be emitted in response to microwaves, and an article is made using a raw material which is used to manufacture ceramics, and an exothermic plate body is made of an exothermic element prepared by mixing with one or more selected from the group consisting of silicon carbide, ferrite and iron oxide, comprising;

preparing a ceramic raw material in such a way to mix and agitate 3~35 part of water with respect to the total 100 part of a raw material used to manufacture ceramics;

preparing an exothermic raw material in such a way to mix 1~32 part by weight of water with respect to the total 100 part by weight of a mixture which is prepared by mixing the ceramic raw material and the exothermic element at a weight ratio of 3~7:7~3;

forming an exothermic plate body wherein a plate body is formed and has a thickness of 5~95% with respect to a bottom thickness of a forming article which will be finished, using the prepared exothermic raw material, the exothermic plate body being formed in such a way to inject the exothermic raw material into a pressure injection gypsum frame for the formation of the exothermic body; and finishing an article formation wherein the article is formed in such a way to inject a ceramic raw material after the formed exothermic plate body is positioned in the pressure injection gypsum frame for the formation of the article so that the formed exothermic plate body can be positioned on the upper surface or lower surface of the bottom of the forming article.

3. A method for manufacturing exothermic ceramics for a microwave oven wherein heat can be emitted in response to microwaves, and an article is made using a raw material which is used to manufacture ceramics, and an exothermic plate body is made of an exothermic element prepared by mixing with one or more selected from the group consisting of silicon carbide, ferrite and iron oxide, comprising;

forming a first article in such a way that 3~35 part by weight of water mixed and agitated with respect to the total 100 part by weight of a raw material used to manufacture ceramics is injected into a first article gypsum frame of a pressure injection type and is formed;

preparing a burial body wherein an exothermic raw material prepared in such a way to mix 1~32 part by weight of water with respect to the total 100 part by weight of a mixture prepared by mixing at a weight ratio of 3~7:7~3 a ceramic raw material and an exothermic element is formed into a shape of a circular plate, a polygonal plate or a mesh; and forming a second article wherein an article is finished in such a way that an exothermic burial body formed on the upper surface or lower surface of the bottom of the formed first article is positioned, and then is positioned in the second article gypsum frame of the pressure injection type, and the exothermic burial body is buried by injecting the ceramic raw material.

4. A method for manufacturing exothermic ceramics for a microwave oven wherein heat can be emitted in response to microwaves, and an article is made using a raw material which is used to manufacture ceramics, and an exothermic plate body is made of an exothermic element prepared by mixing with one or more selected from the group consisting of silicon carbide, ferrite and iron oxide, comprising;

preparing a ceramic raw material in such a way that 3~32 part by weight is mixed with respect to the total 100 part by weight of a raw material used to manufacture a ceramic;

preparing an exothermic raw material in such a way that 1~32 part by weight is mixed with respect to the total 100 part by weight of a mixture prepared by mixing at a weight ratio of 3~7:7~3 a ceramic raw material and an exothermic element;

forming a first article in such a way that the shape of the article is formed by placing the prepared ceramic raw material in a first press mold of a press forming type; and forming a second article wherein an exothermic plate body is formed in such a way that an exothermic raw material is positioned on the upper surface or lower surface of the bottom of the formed first article and is placed in a second press mold of a press forming type and is press-formed.

5. A method for manufacturing exothermic ceramics for a microwave oven wherein heat can be emitted in response to microwaves, and an article is made using a raw material which is used to manufacture ceramics, and an exothermic plate body is made of an exothermic element prepared by mixing with one or more selected from the group consisting of silicon carbide, ferrite and iron oxide, comprising;

preparing a ceramic raw material in such a way that 3~32 part by weight is mixed with respect to the total 100 part by weight of a raw material used to manufacture a ceramic;

preparing an exothermic raw material in such a way that 1~32 part by weight is mixed with respect to the total 100 part by weight of a mixture prepared by mixing at a weight ratio of 3~7:7~3 a ceramic raw material and an exothermic element;

forming an external article wherein an exterior of an article is formed in such a way that the prepared ceramic raw material is filled in a first press mold and is press-formed;

forming an exothermic plate body wherein an exothermic raw material is filled in the inside of the formed exterior article and is press-formed, and the exothermic plate body is placed; and forming an internal article wherein an interior of an article is formed in such a way that a ceramic raw material is filled in the inside of the exterior article and is press-formed, thus burying the exothermic plate body.

6. A method for manufacturing exothermic ceramics for a microwave oven wherein heat can be emitted in response to microwaves, and an article is made using a raw material which is used to manufacture ceramics, and an exothermic plate body is made of an exothermic element prepared by mixing with one or more selected from the group consisting of silicon carbide, ferrite and iron oxide, comprising;

preparing a ceramic raw material in such a way that 3~35 part by weight is mixed with respect to the total 100 part by weight of a raw material used to manufacture ceramics, and the mixture is processed in a vacuum-pug way;

preparing an exothermic raw material in such a way that 1~32 part by weight of water is mixed with respect to the total 100 part by eight of a mixture which is prepared by mixing at a mixing ratio of 3~7:7:3 a ceramic raw material and an exothermic element, and the mixture is processed in a vacuum-pug way;

forming a first article in such a way that the prepared ceramic raw material is inputted into an automatic and manual roller machine gypsum frame of a spinning wheel forming type and is formed, thus forming a first article; and forming a second article in such a way that the vacuum-pug processed exothermic raw material is inputted into the inside of the first article, and an exothermic plate body of a plate body shape is formed using an automatic and manual roller machine.

7. The method of claim 6, after the second article forming step, further comprising:

forming a third article in such a way that a ceramic raw material is inputted into the inside of the formed second article and is formed using a roller machine in order for the exothermic plate body to be buried.

8. A method for manufacturing exothermic ceramics for a microwave oven wherein heat can be emitted in response to microwaves, and an article is made using a raw material which is used to manufacture ceramics, and an exothermic plate body is made of an exothermic element prepared by mixing with one or more selected from the group consisting of silicon carbide, ferrite and iron oxide, comprising;

preparing a ceramic raw material in such a way that 3~35 part by weight is mixed with respect to the total 100 part by weight of a raw material used to manufacture ceramics, and the mixture is processed in a vacuum-pug way;

preparing an exothermic raw material in such a way that 1~32 part by weight of water is mixed with respect to the total 100 part by eight of a mixture which is prepared by mixing at a mixing ratio of 3~7:7:3 a ceramic raw material and an exothermic element, and the mixture is processed in a vacuum-pug way;

forming an exothermic plate in such a way that the prepared exothermic raw material is inputted into a roller machine gypsum frame, and a bottom portion of the article is formed; and forming an article wherein a ceramic raw material is inputted onto the upper surface of the formed exothermic plate, and then an exterior of the article is finished through the roller machine formation.

9. A method for manufacturing exothermic ceramics for a microwave oven wherein heat can be emitted in response to microwaves, and an article is made using a raw material which is used to manufacture ceramics, and an exothermic plate body is made of an exothermic element prepared by mixing with one or more selected from the group consisting of silicon carbide, ferrite and iron oxide, comprising;

preparing an article slip in a soil-mixed water state in such a way that a raw material used to manufacture ceramics and water are mixed and agitated;

performing a first slip casting in such a way that an article slip is injected into an article formation gypsum mold to form an article, and after 5-minutes pass, an article slip in a soil-mixed water state is removed;

preparing an exothermic raw material in such a way that an exothermic raw material is prepared by mixing at a weight ratio of 3~7:7~3 a raw material used to manufacture ceramics and an exothermic element;

forming an exothermic body in such a way that an exothermic slip in a soil-mixed water state by mixing an exothermic raw material with water is injected into a gypsum mold in which an article is formed, and after 5~60 minutes pass, the exothermic body slip is poured out, thus forming a casting exothermic body or a casting exothermic body in a place shape is formed using the prepared exothermic raw material, and it is positioned at a predetermined position at the article inside the gypsum mold;

performing a second slip casting in such a way that the article slip is injected into the gypsum mold where the exothermic body positions, and after 5~60 minutes pass, the article slip in the soil-mixed water state is removed to the outside, thus forming an interior article; and removing an article from a mold wherein after the second slip casting is performed, and 5~60 minutes pass, a finished article is removed from the gypsum mold.

10. A method for manufacturing exothermic ceramics for a microwave oven wherein heat can be emitted in response to microwaves, and an article is made using a raw material which is used to manufacture ceramics, and an exothermic plate body is made of an exothermic element prepared by mixing with one or more selected from the group consisting of silicon carbide, ferrite and iron oxide, comprising;

preparing an article slip in a soil-mixed water state in such a way that a raw material used to manufacture ceramics and water are mixed and agitated;

injecting an article slip in such a way that 1~60 minutes pass after the prepared article slip is injected into the gypsum mold;

preparing an exothermic slip in such a way that an exothermic slip in a soil-mixed water state is prepared by mixing a weight ratio of 1:99~99:1 an article slip and an exothermic element;

injecting an article slip in such a way that the prepared exothermic slip is injected again into the gypsum mold in which the article slip has been injected, and after 5~120 minutes pass, the exothermic body slip sinks downward within the earlier injected article slip and is placed in a whole into a shape of a plate body; and removing an article from a mold wherein after the above step, a non-hardened article slip in the soil-mixed water state in the gypsum mold and the exothermic body slip are removed, and 5~60 minutes pass, and the finished article is removed from the gypsum mold.

11. An exothermic ceramic for microwaves, comprising:

a plate shaped exothermic body which is made of an exothermic raw material composition containing 30~70 part by weight of a ceramic raw material having a size of a fineness number of 20~250 meshes with respect to the total 100 part by weight of a composition, and 70~30 part by weight of an exothermic element having a size of a fineness number of 20~250 meshes containing one or more selected from the group consisting of silicon carbide, carbon, ferrite and iron oxide, which emit heat in response to microwaves;

a forming article which is formed using a ceramic raw material so as to accommodate contents and includes a bottom which is arranged on the upper surface of the exothermic body, and a rim wall which extends upward integral from the rim of the body;

a first protective layer which is formed by coating a glaze containing as a main ingredient silica and petalite on an outer surface of the forming article; and a second protective layer which is formed by integrally coating a glaze containing as a main ingredient silica and petalite on an inner surface of the forming article and an exposed upper surface of the exothermic body.

12. An exothermic ceramic for microwaves, comprising:

a plate shaped exothermic body which is made of an exothermic raw material composition containing 30~70 part by weight of a ceramic raw material having a size of a fineness number of 20~250 meshes with respect to the total 100 part by weight of a composition, and 70~30 part by weight of an exothermic element having a size of a fineness number of 20~250 meshes containing one or more selected from the group consisting of silicon carbide, carbon, ferrite and iron oxide, which emit heat in response to microwaves;

a forming article which is formed using a ceramic raw material so as to accommodate contents and includes a bottom arranged for the exothermic body to be placed on a lower surface, and a rim wall which extends upward integral from the rim of the body;

a third protective layer which is formed by applying a glaze containing as a main ingredient silica and petalite on an inner surface of the forming article; and a fourth protective layer which is formed by integrally coating a glaze containing as a main ingredient silica and petalite on an outer surface of the forming article and an exposed lower surface of the exothermic body.

13. An exothermic ceramic, comprising:

a forming article which is formed using a ceramic raw material and includes a bottom and a rim wall;

a plate shaped exothermic body which is a plate shaped member attached to a lower surface or an upper surface of the bottom of the forming article and is made of an exothermic raw material composition containing 30~70 part by weight of a ceramic raw material having a size of a fineness number of 20~250 meshes with respect to the total 100 part by weight of a composition, and 70~30 part by weight of an exothermic element having a size of a fineness number of 20~250 meshes containing one or more selected from the group consisting of silicon carbide, carbon, ferrite and iron oxide, which emit heat in response to microwaves;

a forming article which is formed using a ceramic raw material to accommodate contents and includes a bottom formed of an upper body layer and a lower bottom layer while being surrounded like being buried in the inside of the exothermic body, and a rim wall which integrally extends upward from the rim of the bottom; and fifth and sixth protective layers which are formed by coating a glaze containing at a main ingredient silica and petalite on the inner and outer surface of the forming article.

14. The ceramic of claim 11, wherein the exothermic body further includes an exothermic protective layer formed by coating a glaze containing as a main ingredient silica and petalite on an outer surface thereof.

15. The ceramic of any of claims 11, 12 and 13, wherein the ceramic raw material is made of a raw material prepared by mixing one or more selected from the group consisting of clay, kaolin, silica, felspar, fetalite, mullite, white clay, blue ceramic clay, white ceramic clay, combined clay, Sanchung clay, pottery clay, ceramic clay and heat-resisting clay, and the bottom of the forming article and the exothermic body have a thickness ratio of 30~70:70~30 with respect to the total 100 of thickness.

16. The ceramic of any of claims 11, 12 and 14, wherein the exothermic body is formed in a plate shape having a predetermined size corresponding to the bottom of the forming article or is formed in a rod or grain shape provided multiple in number in a plane shape at intervals.

17. The ceramic of any of claims 11, 12 and 13, wherein the bottom and the exothermic body are adhered by a junction layer, and the junction later is a junction raw material which contains one or more selected from the group consisting of bone ash, talc, silica, and petalite.

18. The ceramic of claim 12, wherein the exothermic body further includes an exothermic protective layer formed by coating a glaze containing as a main ingredient silica and petalite on an outer surface thereof.

19. The ceramic of claim 18, wherein the exothermic body is formed in a plate shape having a predetermined size corresponding to the bottom of the forming article or is formed in a rod or grain shape provided multiple in number in a plane shape at intervals.

20. The ceramic of claim 13, wherein the exothermic body further includes an exothermic protective layer formed by coating a glaze containing as a main ingredient silica and petalite on an outer surface thereof.

21. The ceramic of claim 20, wherein the exothermic body is formed in a plate shape having a predetermined size corresponding to the bottom of the forming article or is formed in a rod or grain shape provided multiple in number in a plane shape at intervals.

* * * * *